US011961469B2

(12) United States Patent
Liu et al.

(10) Patent No.: US 11,961,469 B2
(45) Date of Patent: Apr. 16, 2024

(54) DISPLAY MODULE AND CONTROL METHOD THEREOF, DISPLAY DRIVE CIRCUIT, AND ELECTRONIC DEVICE

(71) Applicant: Huawei Technologies Co., Ltd., Shenzhen (CN)

(72) Inventors: Chun Yen Liu, Dongguan (CN); Dustin Yuk Lun Wai, Shenzhen (CN); Chiaching Chu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 141 days.

(21) Appl. No.: 17/631,039

(22) PCT Filed: Jul. 21, 2020

(86) PCT No.: PCT/CN2020/103367
§ 371 (c)(1),
(2) Date: Jan. 28, 2022

(87) PCT Pub. No.: WO2021/017960
PCT Pub. Date: Feb. 4, 2021

(65) Prior Publication Data

US 2022/0327998 A1 Oct. 13, 2022

(30) Foreign Application Priority Data

Jul. 31, 2019 (CN) ......................... 201910704186.1
Sep. 25, 2019 (CN) ......................... 201910923433.7

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01);
(Continued)

(58) Field of Classification Search
CPC .. G09G 3/3208; G09G 3/3225; G09G 3/3233; G09G 3/3266; G09G 2300/0819;
(Continued)

(56) References Cited

U.S. PATENT DOCUMENTS 9,318,048 B2 4/2016 Ma
11,094,895 B2 8/2021 Dai
(Continued)

FOREIGN PATENT DOCUMENTS

CN 102956185 A 3/2013
CN 103218972 A 7/2013
(Continued)

*Primary Examiner* — Stacy Khoo
(74) *Attorney, Agent, or Firm* — SLATER MATSIL, LLP

(57) ABSTRACT

A display module, a display drive circuit, and an electronic device. The display module includes a display and at least one driver group. The display includes M rows of sub-pixels arranged in a matrix form. Each sub-pixel includes a driving transistor, a first reset transistor, a first capacitor, and a light emitting device. Each driver group includes M selecting circuits. The $N^{th}$ selecting circuit is coupled to a second node of a first reset transistor in the $N^{th}$ row of sub-pixels. The selecting circuit is configured to output a second initial voltage Vint2 to the second node, and is configured to output a first initial voltage Vint1 to the second node, where |Vint2|>|Vint1|.

9 Claims, 24 Drawing Sheets

(52) U.S. Cl.
CPC . *G09G 2310/08* (2013.01); *G09G 2320/0233* (2013.01); *G09G 2320/0247* (2013.01); *G09G 2330/021* (2013.01)

(58) Field of Classification Search
CPC ... G09G 2300/0842; G09G 2300/0861; G09G 2310/0251; G09G 2310/0262; G09G 2310/08; G09G 2320/0233; G09G 2320/0247; G09G 2330/021; G09G 2340/0435
See application file for complete search history.

(56) References Cited

U.S. PATENT DOCUMENTS

| | | | |
|---|---|---|---|
| 11,270,630 | B2 | 3/2022 | Xuan et al. |
| 2011/0025677 | A1 | 2/2011 | Park et al. |
| 2011/0057864 | A1 | 3/2011 | Chung |
| 2012/0001893 | A1 | 1/2012 | Jeong et al. |
| 2013/0335397 | A1 | 12/2013 | Kim |
| 2014/0104243 | A1* | 4/2014 | Sakariya .............. G09G 3/3233 345/204 |
| 2014/0111406 | A1 | 4/2014 | Wang et al. |
| 2016/0351124 | A1 | 12/2016 | Kim et al. |
| 2017/0061875 | A1 | 3/2017 | Cho et al. |
| 2017/0110054 | A1 | 4/2017 | Sun et al. |
| 2017/0148383 | A1 | 5/2017 | Kim |
| 2017/0256200 | A1 | 9/2017 | Duan et al. |
| 2018/0108299 | A1 | 4/2018 | Nakamura |
| 2018/0144681 | A1 | 5/2018 | Xiang et al. |
| 2021/0366364 | A1* | 11/2021 | Xuan .................. G09G 3/2074 |

FOREIGN PATENT DOCUMENTS

| | | | |
|---|---|---|---|
| CN | 108538241 | A | 9/2018 |
| CN | 108766977 | A | 11/2018 |
| CN | 110047436 | A | 7/2019 |
| CN | 110675816 | A | 1/2020 |
| EP | 1892695 | A2 | 2/2008 |
| JP | 2011215401 | A | 10/2011 |
| KR | 20150064543 | A | 6/2015 |
| WO | 2019132216 | A1 | 7/2019 |

* cited by examiner

201

201

DISPLAY MODULE AND CONTROL METHOD THEREOF, DISPLAY DRIVE CIRCUIT, AND ELECTRONIC DEVICE

CROSS REFERENCE TO RELATED APPLICATIONS

This application is a national stage of International Application No. PCT/CN2020/103367, filed on Jul. 21, 2020, which claims priority to Chinese Patent Application No. 201910704186.1, filed on Jul. 31, 2019, and Chinese Patent Application No. 201910923433.7, filed on Sep. 25, 2019. All of the aforementioned patent applications are hereby incorporated by reference in their entireties.

TECHNICAL FIELD

This application relates to the field of display technologies, and in particular, to a display module and a control method thereof, a display drive circuit, and an electronic device.

BACKGROUND

With continuous development of display technologies, an electronic device, for example, a mobile phone may display not only an animation but also a static image. When some animations are displayed, to mitigate a dynamic fuzziness, an image refresh rate (namely, a quantity of times of refreshing an image per second) needs to be increased. However, when a static image, for example, a standby image is displayed, a relatively high refresh rate causes an increase in power consumption (power consumption) of the electronic device. To reduce the power consumption, a relatively low refresh rate may be used when the electronic device displays a static image. However, in this case, a display flicker (display flicker) phenomenon occurs on the electronic device, thereby degrading a display effect.

SUMMARY

Embodiments of this application provide a display module and a control method thereof, a circuit system, and an electronic device, to reduce a probability that a display flicker phenomenon occurs when a display displays an image at a low refresh rate.

To achieve the foregoing objective, the following technical solutions are used in the embodiments of this application.

According to a first aspect of the embodiments of this application, a display module is provided. The display module includes a display, a display drive circuit, and at least one driver group. The display includes M rows of sub-pixels arranged in a matrix form. A pixel circuit of each sub-pixel includes a driving transistor, a first reset transistor, a first capacitor, and a light emitting device. M≥2, and M is a positive integer. In addition, a first node of the first reset transistor is coupled to a gate of the driving transistor and a first terminal of the first capacitor. A second terminal of the first capacitor is coupled to a first power voltage input. A first node of the driving transistor is coupled to the first power voltage input in a light emitting phase. A second node of the driving transistor is coupled to the light emitting device. A data voltage output port is configured to output a data voltage. The first node of the first reset transistor is a source, and a second node is a drain; or the first node of the first reset transistor is the drain, and the second node is the source. The first node of the driving transistor is a source, and the second node is a drain; or the first node of the driving transistor is the drain, and the second node is the source. The first power voltage input is configured to input a first power voltage, and is coupled to the data voltage output port of the display drive circuit in a data voltage writing phase. In addition, each driver group includes M selecting circuits. Each selecting circuit is coupled to the display drive circuit, and is configured to receive a first initial voltage Vint1 and a second initial voltage Vint2 that are output by the display drive circuit, where |Vint2|>|Vint1|. The $N^{th}$ selecting circuit is coupled to a second node of a first reset transistor in a pixel circuit of the $N^{th}$ row of sub-pixels. The selecting circuit is further configured to output the second initial voltage Vint2 to the second node of the first reset transistor when the pixel circuit is in a reset phase and a data voltage writing phase, and is configured to output the first initial voltage Vint1 to the second node of the first reset transistor when the pixel circuit is in a light emitting phase. 1≤N≤M, and N is a positive integer. The reset phase is a phase in which the first reset transistor is on. The data voltage writing phase is a phase in which the data voltage is applied to the first node of the driving transistor. The light emitting phase is a phase in which the light emitting device is driven to emit light. In view of this, when the light emitting device emits light, a source-drain voltage of the first reset transistor may be reduced to reduce a leakage current of the first reset transistor. Therefore, when a high refresh rate is switched to a low refresh rate, a relatively large voltage drop of a gate voltage of the driving transistor in the light emitting phase due to the leakage current can be reduced, so that light emitting brightness of the sub-pixels displayed at the low refresh rate is close to that of the sub-pixels displayed at the high refresh rate. Therefore, when the refresh rates are alternated, a probability of a sudden increase of display brightness can be reduced, so that a human eye cannot keenly capture a brightness change, and an occurrence probability of a display flicker phenomenon is reduced.

Optionally, the display further includes M first initial voltage lines. The $N^{th}$ first initial voltage line is coupled to the second node of the first reset transistor in the pixel circuit of the $N^{th}$ row of sub-pixels. Each selecting circuit includes a first selecting transistor and a second selecting transistor. A first node of a first selecting transistor in the $N^{th}$ selecting circuit is coupled to the display drive circuit, a second node of the first selecting transistor is coupled to the $N^{th}$ first initial voltage line, and a gate of the first selecting transistor is configured to receive a first selecting signal. When the first selecting signal is an active signal, the first selecting transistor is turned on, to transmit an initial voltage output by the display drive circuit to the first initial voltage line. In addition, a first node of a second selecting transistor in the $N^{th}$ selecting circuit is coupled to the display drive circuit, a second node of the second selecting transistor is coupled to the $N^{th}$ first initial voltage line, a gate of the second selecting transistor is configured to receive a second selecting signal, and the second selecting signal is a reverse-phase signal of the first selecting signal. When the second selecting signal is an active signal, the second selecting transistor is turned on, to transmit an initial voltage output by the display drive circuit to the first initial voltage line. The first node of the first selecting transistor is a source, and the second node is a drain; or the first node of the first selecting transistor is the drain, and the second node is the source. The first node of the second selecting transistor is a source, and the second node is a drain; or the first node of the second selecting transistor is the drain, and the second node is the source.

Optionally, the display drive circuit has at least one first signal terminal and at least one second signal terminal. The first signal terminal outputs the first initial voltage Vint1. The second signal terminal outputs the second initial voltage Vint2. The first node of the first selecting transistor is coupled to the first signal terminal. The first node of the second selecting transistor is coupled to the second signal terminal. Therefore, when the first selecting transistor is on, the first initial voltage Vint1 may be transmitted to the first initial voltage line; and when the second selecting transistor is on, the second initial voltage Vint2 may be transmitted to the first initial voltage line. The display drive circuit may output the first initial voltage Vint1 and the second initial voltage Vint2 by using two different signal terminals, thereby reducing a probability of signal crosstalk.

Optionally, the pixel circuit further includes a second reset transistor. A gate of the second reset transistor is coupled to a gate of the first reset transistor. A first node of the second reset transistor is coupled to the light emitting device. A second node of a second reset transistor in the pixel circuit of the $N^{th}$ row of sub-pixels is coupled to the $N^{th}$ first initial voltage line. When the second reset transistor is on, a voltage on the first initial voltage line may be transmitted to an anode of the light emitting device, to reset the anode of the light emitting device. The first node of the second reset transistor is a source, and the second node is a drain; or the first node of the second reset transistor is the drain, and the second node is the source.

Optionally, the display further includes M second initial voltage lines. The pixel circuit further includes a second reset transistor. A gate of the second reset transistor is coupled to a gate of the first reset transistor. A first node of the second reset transistor is coupled to the light emitting device. A second node of a second reset transistor in the pixel circuit of the $N^{th}$ row of sub-pixels is coupled to the $N^{th}$ second initial voltage line. The second initial voltage line is further coupled to the second signal terminal of the display drive circuit. The first node of the second reset transistor is a source, and the second node is a drain; or the first node of the second reset transistor is the drain, and the second node is the source. Because the second node of the second reset transistor is coupled to the second initial voltage line, a drain voltage of the second reset transistor may be the second initial voltage Vint2 in a first phase, a second phase, and a third phase. This can reduce a probability that, when the sub-pixels are displayed as a black image, a light leakage phenomenon occurs due to light emitting of the light emitting device because the drain voltage of the second reset transistor increases in the third phase and a leakage current of the second reset transistor flows to the light emitting device.

Optionally, the driver group further includes M phase inverters and M cascaded shift registers. An output of the $N^{th}$ shift register is coupled to an input of the $N^{th}$ phase inverter and the gate of the first selecting transistor in the $N^{th}$ selecting circuit. The output of the shift register is configured to output the first selecting signal. An output of the $N^{th}$ phase inverter is coupled to the gate of the second selecting transistor in the $N^{th}$ selecting circuit. The output of the phase inverter is configured to output the second selecting signal. Therefore, the shift register may provide the first selecting signal to the gate of the first selecting transistor, and may also provide the selecting signal to the gate of the second selecting transistor by using the phase inverter, so that no circuit for providing the first selecting signal needs to be disposed separately.

Optionally, the pixel circuit further includes a first light emitting control transistor and a second light emitting control transistor. A first node of the first light emitting control transistor is coupled to the first power voltage input. A second node of the first light emitting control transistor is coupled to the first node of the driving transistor. A first node of the second light emitting control transistor is coupled to the second node of the driving transistor. A second node of the second light emitting control transistor is coupled to the light emitting device. The light emitting device is further coupled to a second power voltage input, and the second power voltage input is configured to input a second power voltage. The output of the shift register is further coupled to gates of the first light emitting control transistor and the second light emitting control transistor. When a signal output by the shift register controls the first light emitting control transistor and the second light emitting control transistor to be turned on, a driving current generated by the driving transistor may flow through the light emitting device to drive the light emitting device to emit light. The first node of the first light emitting control transistor is a source, and the second node is a drain; or the first node of the first light emitting control transistor is the drain, and the second node is the source. The first node of the second light emitting control transistor is a source, and the second node is a drain; or the first node of the second light emitting control transistor is the drain, and the second node is the source.

Optionally, the display module includes a first driver group and a second driver group. The first driver group and the second driver group are respectively located on two sides of a display area of the display. Both the $N^{th}$ selecting circuit in the first driver group and the $N^{th}$ selecting circuit in the second driver group are coupled to the second node of the first reset transistor in the pixel circuit of the $N^{th}$ row of sub-pixels. In this case, when the display has a relatively high resolution, a quantity of sub-pixels in a row is relatively large. The first driver group and the second driver group are respectively disposed on a left side and a right side of the display area, so that a selecting circuit in the first driver group and a selecting circuit in the second driver group provide the first initial voltage Vint1 and the second initial voltage Vint2 to a second node of each first reset transistor in a same row of sub-pixels from the left side and the right side respectively, thereby effectively reducing signal attenuation.

Optionally, the display module includes a substrate. The pixel circuit, the display drive circuit, and the driver group are disposed on the substrate. A material that the substrate is made of includes a flexible material or a tensile material. In this case, the display may be a flexible display capable of stretching and bending. An electronic device with the flexible display may be a foldable mobile phone or a foldable tablet computer.

According to a second aspect of the embodiments of this application, an electronic device is provided, including the foregoing display module. The electronic device achieves same technical effects as those achieved by the display module provided in the foregoing embodiments. Details are not described herein again.

According to a third aspect of the embodiments of this application, a control method for a display module is provided. The display module includes a display, a display drive circuit, and at least one driver group. The display includes M rows of sub-pixels arranged in a matrix form. A pixel circuit of each sub-pixel includes a driving transistor, a first reset transistor, a first capacitor, and a light emitting device. $M \geq 2$, and M is a positive integer. In addition, a first node of the first reset transistor is coupled to a gate of the driving transistor and a first terminal of the first capacitor. A second terminal of the first capacitor is coupled to a first power voltage input. A first node of the driving transistor is coupled to the first power voltage input in a light emitting phase, and is coupled to a data voltage output port of the display drive circuit in a data voltage writing phase. A second node of the driving transistor is coupled to the light emitting device. The first node of the first reset transistor is a source, and a second node is a drain; or the first node of the first reset transistor is the drain, and the second node is the source. The first node of the driving transistor is a source, and the second node is a drain; or the first node of the driving transistor is the drain, and the second node is the source. The first power voltage input is configured to input a first power voltage. The data voltage output port is configured to output a data voltage. In addition, each driver group includes M selecting circuits. Each selecting circuit is coupled to the display drive circuit, and is configured to receive a first initial voltage Vint1 and a second initial voltage Vint2 that are output by the display drive circuit, where $|Vint2|>|Vint1|$. The $N^{th}$ selecting circuit is coupled to a second node of a first reset transistor in a pixel circuit of the $N^{th}$ row of sub-pixels. The selecting circuit is further configured to output the second initial voltage Vint2 to the second node of the first reset transistor when the pixel circuit is in a reset phase and a data voltage writing phase, and is configured to output the first initial voltage Vint1 to the second node of the first reset transistor when the pixel circuit is in a light emitting phase. $1 \le N \le M$, and N is a positive integer. The control method for the display module includes: First, the M rows of sub-pixels are controlled to be displayed row by row. When the $N^{th}$ row of sub-pixels in the M rows of sub-pixels is controlled to be displayed, the $N^{th}$ selecting circuit receives the first initial voltage Vint1 and the second initial voltage Vint2 that are output by the display drive circuit. The $N^{th}$ selecting circuit outputs the second initial voltage Vint2 to the second node of the first reset transistor in the pixel circuit of the $N^{th}$ row of sub-pixels. The first reset transistor is turned on, and the second initial voltage Vint2 is transmitted to the gate of the driving transistor. The pixel circuit of the $N^{th}$ row of sub-pixels is in the reset phase. The reset phase is a phase in which the first reset transistor is on. Then, the data voltage is written to the first node of the driving transistor, and the first reset transistor is controlled to be cut off. The pixel circuit of the $N^{th}$ row of sub-pixels is in the data voltage writing phase. The $N^{th}$ selecting circuit outputs the second initial voltage Vint2 to the second node of the first reset transistor in the pixel circuit of the $N^{th}$ row of sub-pixels. The data voltage writing phase is a phase in which the data voltage is applied to the first node of the driving transistor. Then, a light emitting device in the pixel circuit of the $N^{th}$ row of sub-pixels is controlled to emit light. The pixel circuit of the $N^{th}$ row of sub-pixels is in the light emitting phase. The $N^{th}$ selecting circuit outputs the first initial voltage Vint1 to the second node of the first reset transistor in the pixel circuit of the $N^{th}$ row of sub-pixels. The light emitting phase is a phase in which the light emitting device is driven to emit light. The control method for the display module achieves same technical effects as those achieved by the display module provided in the foregoing embodiments. Details are not described herein again.

Optionally, a value range of the first initial voltage Vint1 is 0 to 2 V. When the first initial voltage Vint1 is less than 0 V, a difference between a source-drain voltage of the first reset transistor in the light emitting phase and a source-drain voltage of the first reset transistor in the other two phases (the reset phase and the data voltage writing phase) is relatively small. As a result, a leakage current of the first reset transistor cannot be effectively reduced in the light emitting phase, and an effect of eliminating a display flicker phenomenon is degraded. In addition, when the first initial voltage Vint1 is greater than 2 V, a leakage current of the second reset transistor flows to the light emitting device. As a result, when the sub-pixels are displayed as a black image, the light emitting device emits light, causing a light leakage phenomenon.

According to a fourth aspect of the embodiments of this application, a control method for a display module is provided. The display module includes a display and a display drive circuit. The display includes M rows of sub-pixels arranged in a matrix form. A pixel circuit of each sub-pixel includes a driving transistor, a first reset transistor, a first capacitor, and a light emitting device. $M \ge 2$, and M is a positive integer. In addition, a first node of the first reset transistor is coupled to a gate of the driving transistor and a first terminal of the first capacitor. A second terminal of the first capacitor is coupled to a first power voltage input. A first node of the driving transistor is coupled to the first power voltage input in a light emitting phase, and is coupled to a data voltage output port of the display drive circuit in a data voltage writing phase. A second node of the driving transistor is coupled to the light emitting device. The data voltage output port is configured to output a data voltage. The first node of the first reset transistor is a source, and a second node is a drain; or the first node of the first reset transistor is the drain, and the second node is the source. The first node of the driving transistor is a source, and the second node is a drain; or the first node of the driving transistor is the drain, and the second node is the source. The first power voltage input is configured to input a first power voltage. The data voltage output port is configured to output a data voltage. In view of this, the control method for the display module includes: First, the M rows of sub-pixels are controlled to be displayed row by row at a first refresh rate. When the $N^{th}$ row of sub-pixels in the M rows of sub-pixels is controlled to be displayed, the display drive circuit outputs, in a reset phase, the data voltage writing phase, and the light emitting phase, a second initial voltage Vint2 to a second node of a first reset transistor in a pixel circuit of the $N^{th}$ row of sub-pixels. Then, the M rows of sub-pixels are controlled to be displayed row by row at a second refresh rate. The second refresh rate is less than the first refresh rate. When the $N^{th}$ row of sub-pixels in the M rows of sub-pixels is controlled to be displayed, the display drive circuit outputs, in the reset phase, the data voltage writing phase, and the light emitting phase, a first initial voltage Vint1 to the second node of the first reset transistor in the pixel circuit of the $N^{th}$ row of sub-pixels. $|Vint2|>|Vint1|$. In addition, the reset phase is a phase used to turn on the first reset transistor, the data voltage writing phase is a phase used to write the data voltage to the first node of the driving transistor, and the light emitting phase is a phase used to drive the light emitting device to emit light. The control method for the display module achieves same technical effects as those achieved by the display module provided in the foregoing embodiments. Details are not described herein again.

According to a fifth aspect of the embodiments of this application, a display drive circuit is provided. The display includes M rows of sub-pixels arranged in a matrix form. A pixel circuit of each sub-pixel includes a driving transistor, a first reset transistor, a first capacitor, and a light emitting device. $M \ge 2$, and M is a positive integer. A first node of the first reset transistor is coupled to a gate of the driving transistor and a first terminal of the first capacitor. A second terminal of the first capacitor is coupled to a first power voltage input. A first node of the driving transistor is coupled to the first power voltage input in a light emitting phase, and is coupled to a data voltage output port of the display drive circuit in a data voltage writing phase. A second node of the driving transistor is coupled to the light emitting device. The first node of the first reset transistor is a source, and a second node is a drain; or the first node of the first reset transistor is the drain, and the second node is the source. The first node of the driving transistor is a source, and the second node is a drain; or the first node of the driving transistor is the drain, and the second node is the source. The first power voltage input is configured to input a first power voltage. The data voltage output port is configured to output a data voltage. In view of this, the display drive circuit is configured to: control the M rows of sub-pixels to be displayed row by row at a first refresh rate; when the $N^{th}$ row of sub-pixels in the M rows of sub-pixels is controlled to be displayed, output, in a reset phase, the data voltage writing phase, and the light emitting phase, a second initial voltage Vint2 to a second node of a first reset transistor in a pixel circuit of the $N^{th}$ row of sub-pixels; control the M rows of sub-pixels to be displayed row by row at a second refresh rate, where the second refresh rate is less than the first refresh rate; and when the $N^{th}$ row of sub-pixels in the M rows of sub-pixels is controlled to be displayed, output, in the reset phase, the data voltage writing phase, and the light emitting phase, a first initial voltage Vint1 to the second node of the first reset transistor in the pixel circuit of the $N^{th}$ row of sub-pixels, where $|Vint2|>|Vint1|$. In addition, the reset phase is a phase in which the first reset transistor is on, the data voltage writing phase is a phase in which the data voltage is applied to the first node of the driving transistor, and the light emitting phase is a phase in which the light emitting device emits light. The control method for the circuit system achieves same technical effects as those achieved by the control method for the display module provided in the foregoing embodiments. Details are not described herein again.

According to a sixth aspect of the embodiments of this application, an electronic device is provided. The electronic device includes a display and a display drive circuit. The display includes M rows of sub-pixels arranged in a matrix form. A pixel circuit of each sub-pixel includes a driving transistor, a first reset transistor, a first capacitor, and a light emitting device. $M \geq 2$, and M is a positive integer. A first node of the first reset transistor is coupled to a gate of the driving transistor and a first terminal of the first capacitor. A second terminal of the first capacitor is coupled to a first power voltage input. A first node of the driving transistor is coupled to the first power voltage input in a light emitting phase, and is coupled to a data voltage output port of the display drive circuit in a data voltage writing phase. A second node of the driving transistor is coupled to the light emitting device. The first node of the first reset transistor is a source, and a second node is a drain; or the first node of the first reset transistor is the drain, and the second node is the source. The first node of the driving transistor is a source, and the second node is a drain; or the first node of the driving transistor is the drain, and the second node is the source. The first power voltage input is configured to input a first power voltage. The data voltage output port is configured to output a data voltage. In view of this, the display drive circuit is configured to: control the M rows of sub-pixels to be displayed row by row at a first refresh rate; and when the $N^{th}$ row of sub-pixels in the M rows of sub-pixels is controlled to be displayed, output, in a reset phase, the data voltage writing phase, and the light emitting phase, a second initial voltage Vint2 to a second node of a first reset transistor in a pixel circuit of the $N^{th}$ row of sub-pixels. In addition, the display drive circuit is further configured to: control the M rows of sub-pixels to be displayed row by row at a second refresh rate, where the second refresh rate is less than the first refresh rate; and when the $N^{th}$ row of sub-pixels in the M rows of sub-pixels is controlled to be displayed, output, in the reset phase, the data voltage writing phase, and the light emitting phase, a first initial voltage Vint1 to the second node of the first reset transistor in the pixel circuit of the $N^{th}$ row of sub-pixels, where $|Vint2|>|Vint1|$. In addition, the reset phase is a phase in which the first reset transistor is on, the data voltage writing phase is a phase in which the data voltage is applied to the first node of the driving transistor, and the light emitting phase is a phase in which the light emitting device emits light. The control method for the electronic device achieves same technical effects as those achieved by the control method for the display module provided in the foregoing embodiments. Details are not described herein again.

According to a seventh aspect of the embodiments of this application, a computer-readable medium is provided, and the computer-readable medium stores a computer program. When the computer program is executed by a processor, any one of the foregoing methods is implemented. The computer-readable medium achieves same technical effects as those achieved by the control method for the display module provided in the foregoing embodiments. Details are not described herein again.

REFERENCE SIGNS

Figure 1A:
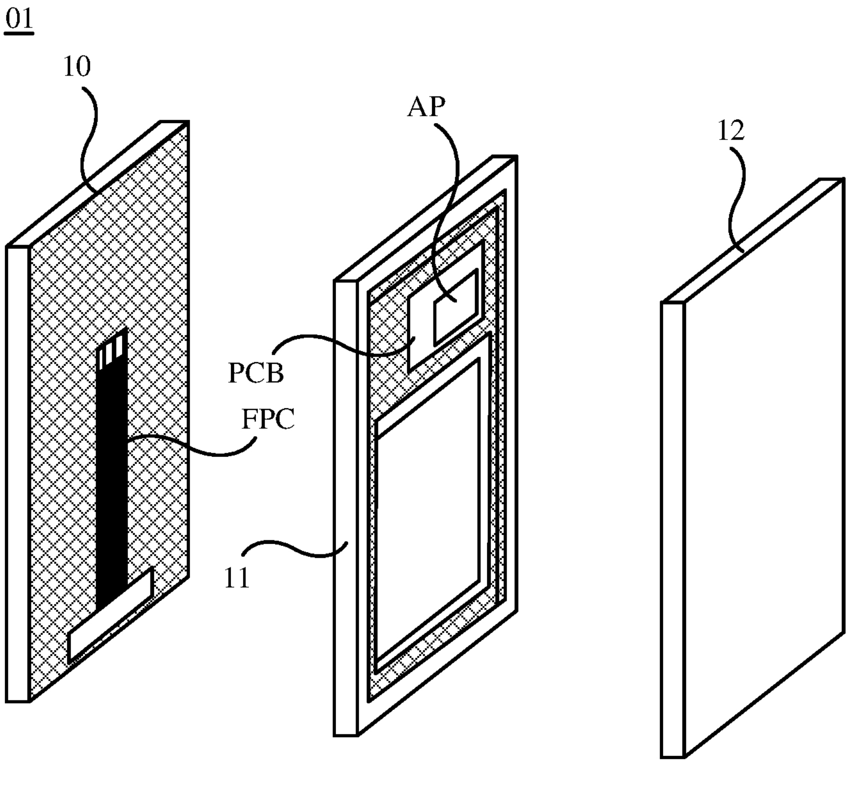
FIG. 1*a* is a schematic diagram of a structure of an electronic device according to some embodiments of this application.

01: electronic device; 10: display; 11: middle frame; 12: housing; 20: sub-pixel; 201: pixel circuit; 100: AA area; 101: non-display area; 30: driver group; 301: selecting circuit; 302: phase inverter; and 40: display drive circuit.

DETAILED DESCRIPTION OF ILLUSTRATIVE EMBODIMENTS

The following describes the technical solutions in the embodiments of this application with reference to the accompanying drawings in the embodiments of this application. Apparently, the described embodiments are merely some but not all of the embodiments of this application.

In the following, terms "first", "second", and the like are merely intended for a purpose of description, and shall not be understood as an indication or implication of relative importance or an implicit indication of a quantity of indicated technical features. Therefore, a feature limited by "first", "second", or the like may explicitly or implicitly include one or more features. In the descriptions of this application, "plurality" means at least two, unless otherwise specified.

In addition, in this application, orientation terms such as "up", "down", "left", and "right" are defined with respect to placement orientations of components in the accompanying drawings. It should be understood that these directional terms are relative concepts and are used for relative descriptions and clarifications, and may vary accordingly based on changes of the placement orientations of the components in the accompanying drawings.

An embodiment of this application provides an electronic device. For example, the electronic device includes a television, a mobile phone, a tablet computer, a personal digital assistant (personal digital assistant, PDA), a vehicle-mounted computer, or the like. A specific form of the electronic device is not particularly limited in this embodiment of this application. For ease of description, an example in which the electronic device is a mobile phone is used for description below.

In this case, the electronic device mainly includes a display module. The display module may include a display 10, a middle frame 11, and a housing 12 shown in FIG. 1*a*. The display 10 is mounted on the middle frame 11, and the middle frame 11 is connected to the housing 12. The display 10 has a display surface and a rear surface away from the display surface.

When the display 10 is mounted on the middle frame 11 and is connected to the housing 12 by using the middle frame 11, the housing 12 is disposed on the rear surface of the display 10. The electronic device 01 further includes a printed circuit board (printed circuit board, PCB) on which an application processor (application processor, AP) is disposed.

It should be noted that the foregoing describes an example of a structure of the display module. In some other embodiments of this application, the display module may alternatively have two displays 10. The two displays 10 may be respectively disposed on two sides of the middle frame 11, so that displaying can be performed on both a front surface and a rear surface of the electronic device.

Figure 1B:
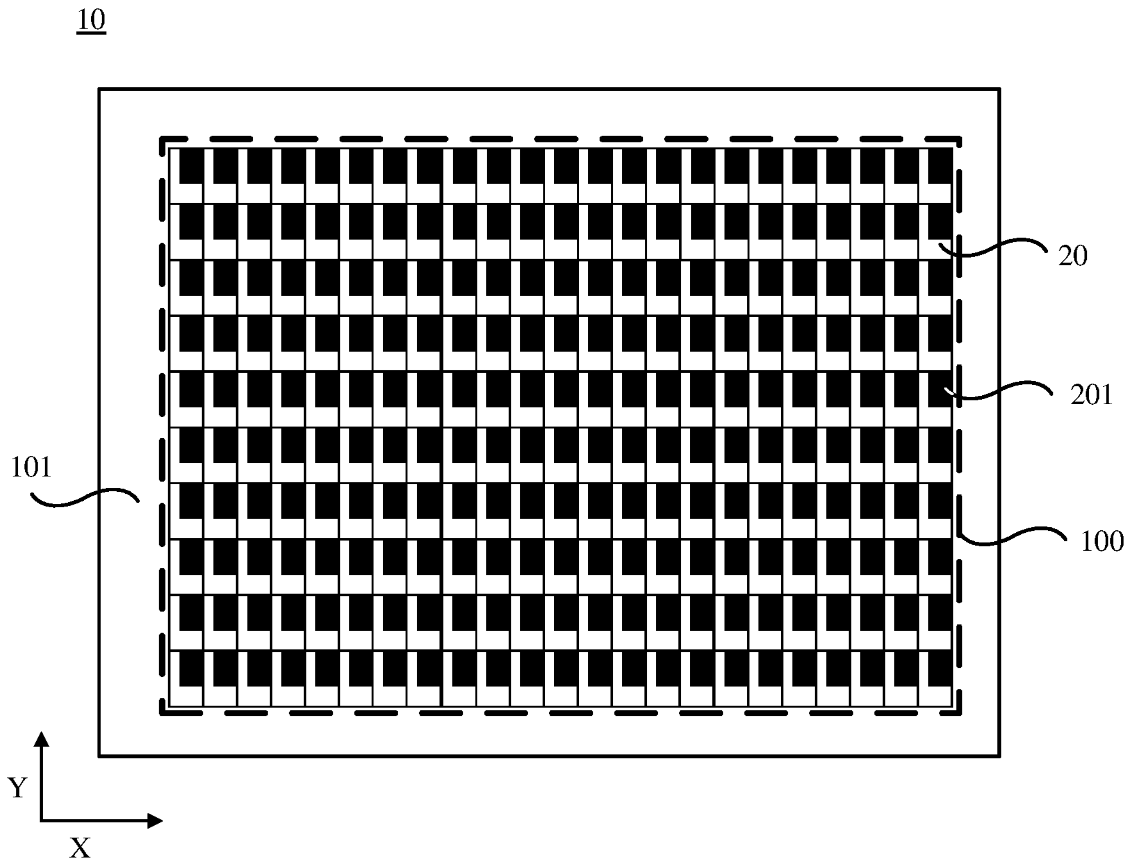
FIG. 1*b* is a schematic diagram of a structure of a display in FIG. 1*a;*

In addition, as shown in FIG. 1*b*, the display 10 includes an active area (active area, AA) 100 and a non-display area 101 located around the AA area 100.

The AA area 100 is used to display an image. As shown in FIG. 1*b*, the AA area 100 includes a plurality of sub-pixels (sub pixel) 20. A sub-pixel may also be referred to as a sub-pixel or a sub-pixel. For ease of description, this application is described by using an example in which the plurality of sub-pixels 20 are arranged in a matrix form.

It should be noted that, in this embodiment of this application, sub-pixels 20 arranged in a line along a horizontal direction X are referred to as one row of sub-pixels, and sub-pixels 20 arranged in a line along a vertical direction Y are referred to as one column of sub-pixels. For ease of description, an example in which M rows of sub-pixels 20 are arranged in the AA area 100 is used for description below. $M \geq 2$, and M is a positive integer.

Figure 2A:
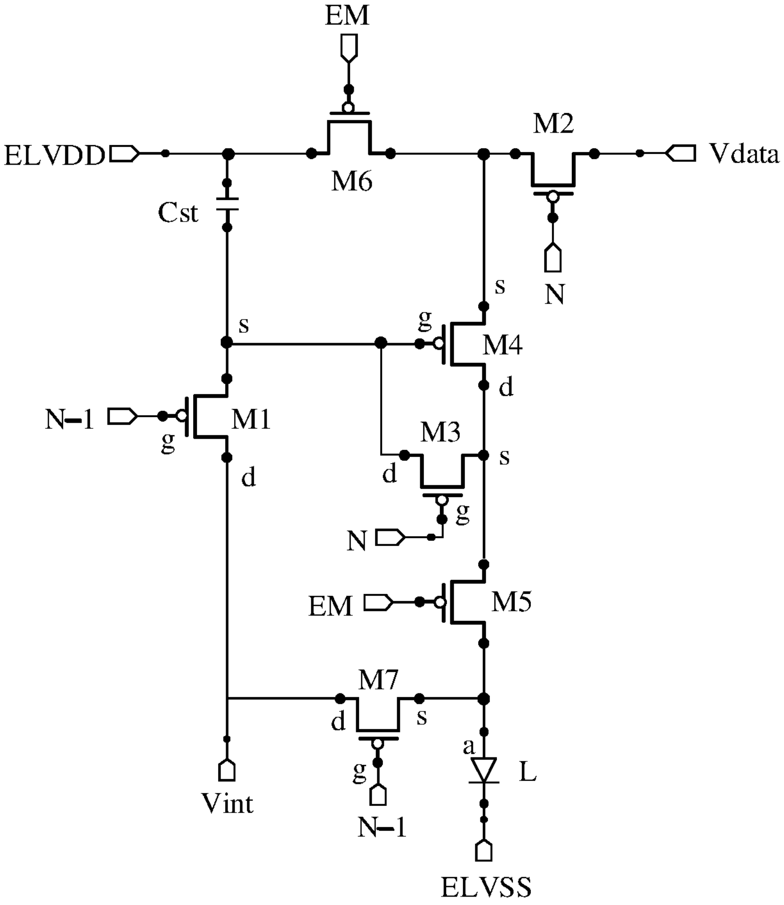
FIG. 2*a* is a schematic diagram of a structure of a pixel circuit according to an embodiment of this application.

In the sub-pixels 20 in the AA area 100, a pixel circuit configured to control the sub-pixels 20 to perform display is disposed. In some embodiments, as shown in FIG. 2*a*, the pixel circuit 201 includes at least a driving transistor M4, a first reset transistor M1, a first capacitor Cst, and a light emitting device L. A first node, for example, a source (source, s), of the first reset transistor M1 is coupled to a gate (gate, g) of the driving transistor M4 and a first terminal of the first capacitor Cst (a lower electrode plate of Cst in FIG. 2*a*). A second terminal of the first capacitor Cst (a lower electrode plate of Cst in FIG. 2*a*) is coupled to a first power voltage input (configured to output a first power voltage ELVDD).

It should be noted that the first node of the first reset transistor M1 may be a source s, and a second node may be a drain d; or the first node of the first reset transistor M1 may be a drain d, and the second node may be a source s. For ease of description, this embodiment of this application is described by using an example in which the first node of the first reset transistor M1 is a source s and the second node is a drain d.

In addition, a first node, for example, a source s, of the driving transistor M4 is coupled to the first power voltage input in a light emitting phase (a third phase ③ shown in FIG. 3), so that the first power voltage ELVDD provided by the first power voltage input can be received in the light emitting phase. In addition, the first node, for example, the source s, of the driving transistor M4 is coupled to a data voltage input in a data voltage writing phase (a second phase ② shown in FIG. 3), so that a data voltage Vdata provided by the data voltage input can be received in the data voltage writing phase. A second node, for example, a drain (drain, d for short), of the driving transistor M4 is coupled to the light emitting device L.

It should be noted that the first node of the driving transistor M4 may be a source s, and the second node may be a drain d; or the first node of the driving transistor M4 may be a drain d, and the second node may be a source s. For ease of description, this embodiment of this application is described by using an example in which the first node of the driving transistor M4 is a source s and the second node is a drain d.

In addition, the light emitting device L may be an organic light emitting diode (organic light emitting diode, OLED). In this case, the display 10 is an OLED display. Alternatively, the light emitting device L may be a micro light emitting diode (micro light emitting diode, micro LED). In this case, the display 10 is a micro LED display. The display 10 can implement self-illumination. For ease of description, an example in which the light emitting device L is an OLED is used for description below.

In this case, the second node, for example, the drain d, of the driving transistor M4 may be coupled to an anode (anode, a) of the light emitting device L. A cathode (cathode, c) of the light emitting device L is coupled to a second power voltage input (configured to output a second power voltage ELVSS).

In addition, in an example in which the pixel circuit 201 has a 7T1C structure shown in FIG. 2*a*, the pixel circuit 201 may further include the first capacitor Cst and a plurality of transistors (M2, M3, M5, M6, M7). For ease of description, the transistor M7 is referred to as a second reset transistor, the transistor M6 is referred to as a first light emitting control transistor, and the transistor M5 is referred to as a second light emitting control transistor.

A first node, for example, a source s, of the first light emitting control transistor M6 is coupled to the first power voltage input, to receive the first power voltage ELVDD provided by the first power voltage input. A second node, for example, a drain d, of the first light emitting control transistor M6 is coupled to the first node, for example, the source s, of the driving transistor M4. A first node, for example, a source s, of the second light emitting control transistor M5 is coupled to the second node, for example, the drain d, of the driving transistor M4. A second node, for example, a drain d, of the second light emitting control transistor M5 is coupled to the anode of the light emitting device L, for example, the OLED.

It should be noted that the first node of the first light emitting control transistor M6 may be a source s, and the second node may be a drain d; or the first node of the first light emitting control transistor M6 may be a drain d, and the second node may be a source s. For ease of description, this embodiment of this application is described by using an example in which the first node of the first light emitting control transistor M6 is a source s and the second node is a drain d. Similarly, the first node of the second light emitting control transistor M5 may be a source s, and the second node may be a drain d; or the first node of the second light emitting control transistor M5 may be a drain d, and the second node may be a source s. For ease of description, this embodiment of this application is described by using an example in which the first node of the second light emitting control transistor M5 is a source s and the second node is a drain d. Similarly, a first node of the second reset transistor M7 may be a source s, and a second node may be a drain d; or the first node of the second reset transistor M7 may be a drain d, and the second node may be a source s. For ease of description, this embodiment of this application is described by using an example in which the first node of the second reset transistor M7 is a source s and the second node is a drain d.

In addition, the display 10 further includes a substrate configured to carry the pixel circuit 201. In some embodiments of this application, the substrate may be made of a flexible material. The flexible material may be flexible glass or polyimide (polyimide, PI). Alternatively, in some other embodiments of this application, the substrate material may be made of a tensile material. A deformation of the tensile material may be greater than or equal to 5%. For example, the tensile material may be polydime thylsiloxane (polydime thylsiloxane, PDMS). In this case, the display 10 may be a flexible display capable of stretching and bending. The electronic device 01 with the flexible display may be a foldable mobile phone or a foldable tablet computer.

Alternatively, the substrate may be made of a relatively rigid material, for example, rigid glass or sapphire. In this case, the display 10 is a rigid display.

Figure 2B:
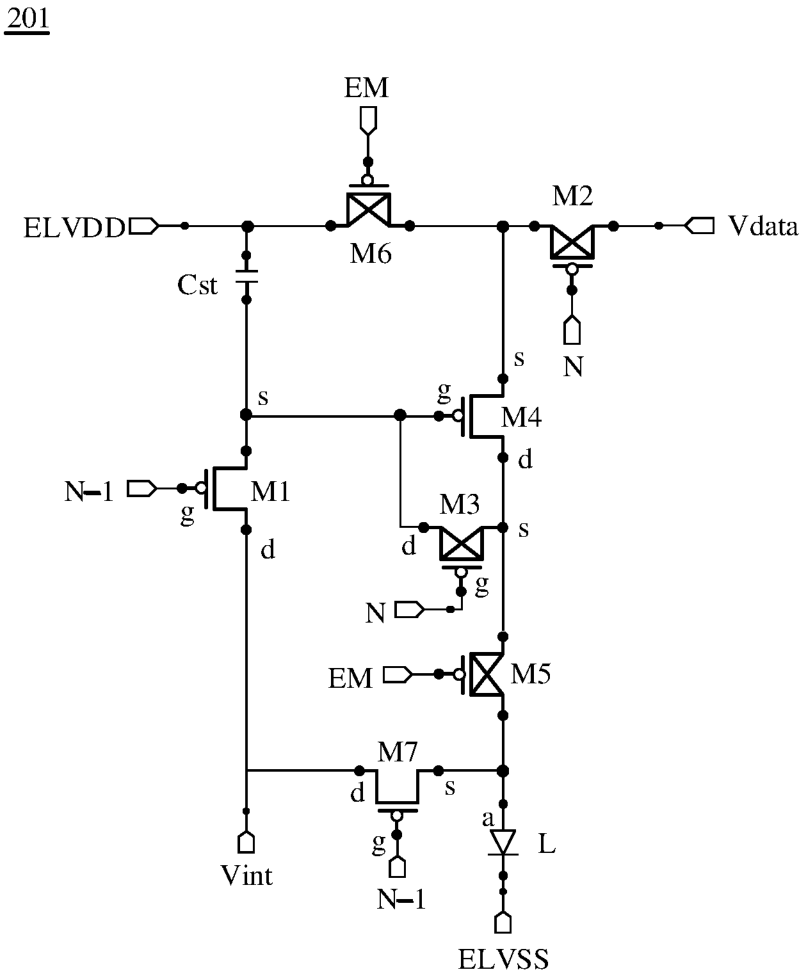
FIG. 2*b*, FIG. 2*c*, and FIG. 2*d* are equivalent circuit diagrams when a pixel circuit is in a first phase ①, a second phase ②, and a third phase ③ respectively.
Figure 2C:
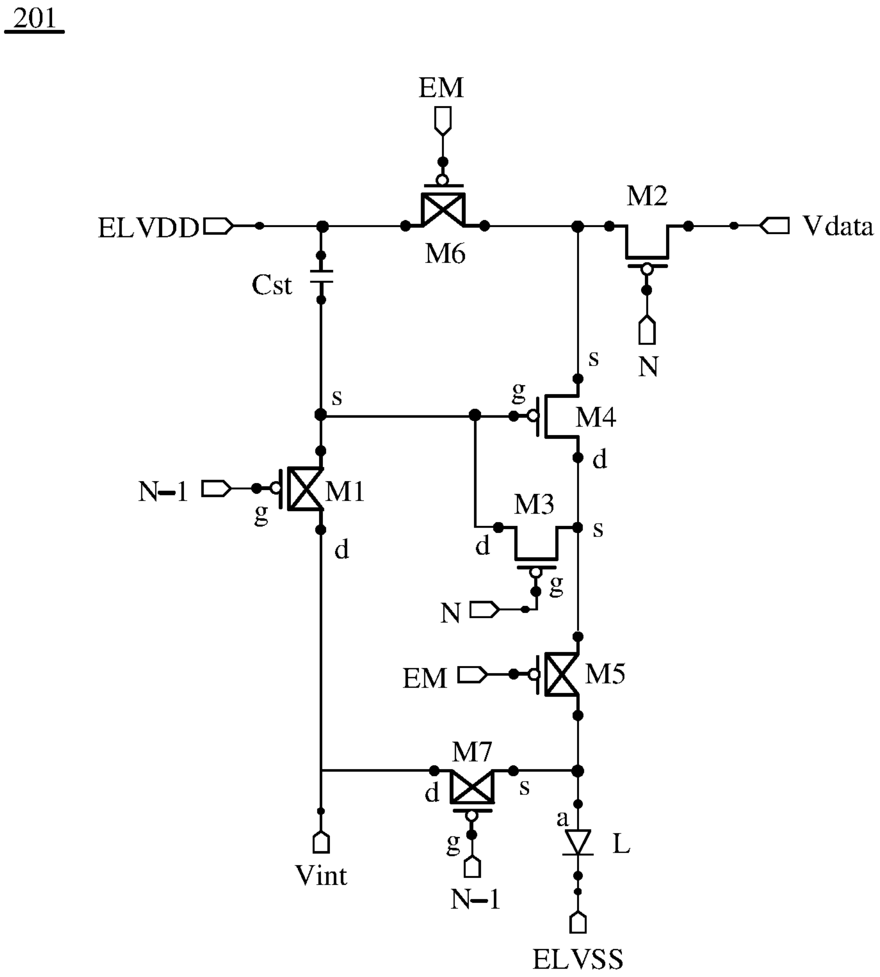
Figure 2D:
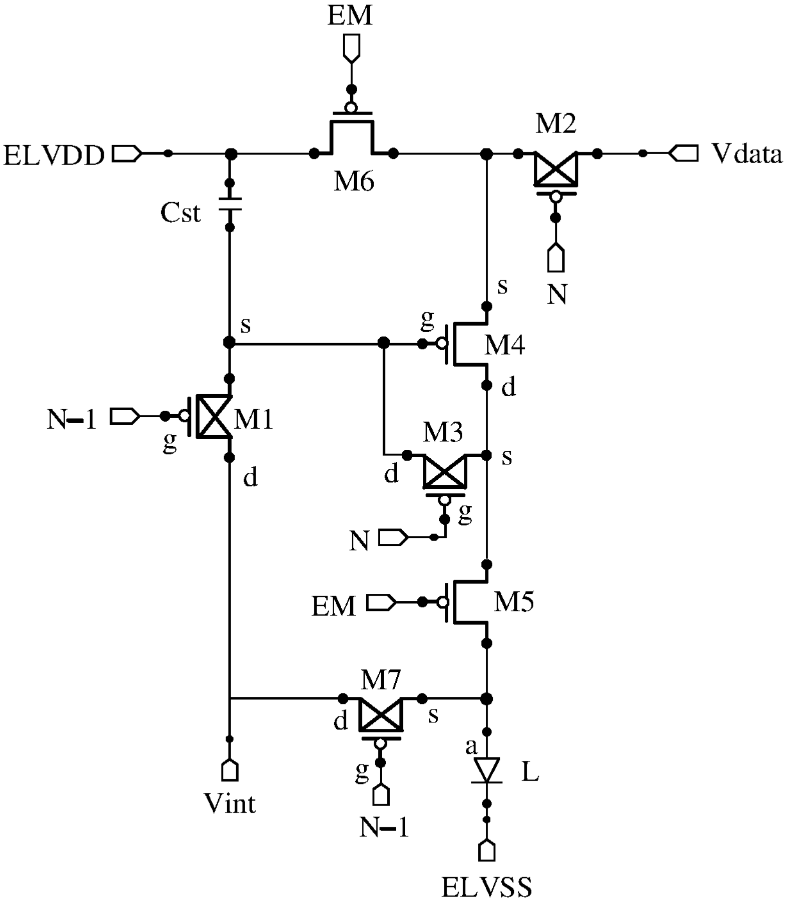
Figure 3:
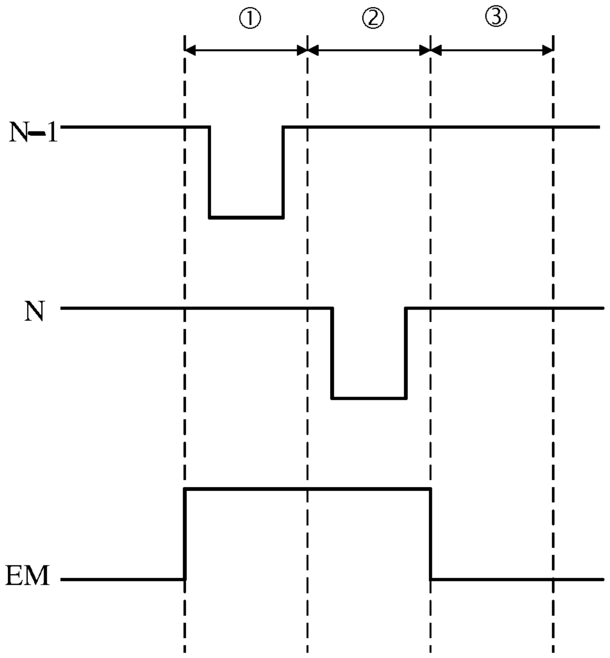
FIG. 3 is a sequence control diagram of a pixel circuit shown in FIG. 2*a;*

Based on the structure of the pixel circuit 201 shown in FIG. 2*a*, an operating process of the pixel circuit 201 includes three phases shown in FIG. 3: a first phase ①, the second phase ②, and the third phase ③. In FIG. 2*b*, FIG. 2*c*, and FIG. 2*d*, for ease of description, a "x" mark is added to a transistor that is off for differentiation.

In the first phase ①, the first reset transistor M1 and the second reset transistor M7 are turned on under control of a selecting signal N−1, as shown in FIG. 2*b*. An initial voltage Vint is transmitted to the gate of the driving transistor M4 through the first reset transistor M1, to reset the gate of the driving transistor M4. In addition, an initial voltage Vint is transmitted to the anode a of the OLED through the second reset transistor M7, to reset the anode a of the OLED. In this case, a voltage Va at the anode a of the OLED and a voltage Vg4 at the gate g of the driving transistor M4 are Vint.

Therefore, the voltages at the gate g of the driving transistor M4 and the anode a of the OLED can be reset to the initial voltage Vint in the first phase ①, to prevent residual voltages of an image frame at the gate g of the driving transistor M4 and the anode a of the OLED from affecting a next image frame. Therefore, the first phase ① may be referred to as a reset phase. It can be learned from the foregoing descriptions that the reset phase is a phase in which the first reset transistor M1 is on.

In the second phase ②, the transistor M2 and the transistor M3 are turned on under control of a selecting signal N, as shown in FIG. 2*c*. When the transistor M3 is on, the gate g and the drain d of the driving transistor M4 are coupled, and the driving transistor M4 is in a diode on state. In this case, the data voltage Vdata is written to the source s of the driving transistor M4 through the transistor M2 that is on. Therefore, the second phase ② may be referred to as a data voltage Vdata writing phase of the pixel circuit. It can be learned from the foregoing descriptions that the data voltage writing phase is a phase in which the data voltage Vdata is applied to the first node, for example, the source s, of the driving transistor M4.

In this case, a source s voltage Vs4 of the driving transistor M4 meets Vs4=Vdata. It can be learned, based on an on characteristic of a transistor, that a drain d voltage Vd4 of the driving transistor M4 meets Vd4=Vdata−|Vth_M4|. Because the transistor M3 is on, the gate g voltage Vg4 and the drain d voltage Vd4 of the driving transistor M4 are the same.

Therefore, the gate g voltage Vg4 of the driving transistor M4 meets Vg4=Vdata−|Vth_M4|. Therefore, the gate voltage Vg4 of the driving transistor M4 is related to the threshold voltage Vth_M4 of the driving transistor M4, thereby compensating for the threshold voltage Vth_M4.

In the third phase ③, the second light emitting control transistor M5 and the first light emitting control transistor M6 are turned on under control of a light emitting control signal EM, and a current path between the first power voltage ELVDD and the second power voltage ELVSS is turned on. A driving current I generated by the driving transistor M4 is transmitted to the OLED through the current path, to drive the OLED to emit light. It can be learned from the foregoing descriptions that the light emitting phase is a phase in which the light emitting device L is driven to emit light.

A source-gate voltage Vsg4 of the driving transistor M4 meets Vsg4=Vs4−Vg4=ELVDD−(Vdata−|Vth_M4|). In addition, the current driving the OLED to emit light meets the following formula:

$$Isd=\tfrac{1}{2}\times\mu\times Cgi\times W/L\times(Vsg4-|Vth\_M4|)^2 \quad (1)$$

It can be learned from the current formula of the OLED that the driving current Isd flowing through the OLED meets $Isd=\tfrac{1}{2}\times\mu\times Cgi\times W/L\times(ELVDD-Vdata+|Vth\_M4|-|Vth\_M4|)^2=\tfrac{1}{2}\times\mu\times Cgi\times W/L\times(ELVDD-Vdata)^2$, where μ is a carrier mobility of the driving transistor M4, Cgi is a capacitance between the gate g of the driving transistor M4 and a channel, W/L is a width-to-length ratio of the driving transistor M4, and Vth_M4 is the threshold voltage of the driving transistor M4.

Because the current Isd is irrelevant to the threshold voltage Vth_M4 of the driving transistor M4, a phenomenon of uneven brightness caused by a difference in threshold voltages of driving transistors of the sub-pixels can be avoided. Therefore, after the threshold voltage is compensated for in the second phase ②, an effect of uniform brightness on the display 10 can be achieved in the third phase ③. Because the OLED emits light in the third phase ③, the third phase ③ may be referred to as a light emitting phase.

Based on the structure of the foregoing pixel circuit, the sub-pixels 20 in the display 10 are scanned and emit light row by row. Therefore, when a frame of image is to be displayed, after the is row of sub-pixels 20 emits light, a light emitting state needs to be kept until the last row of sub-pixels 20 emits light, so that the frame of image can be displayed.

Figure 4:
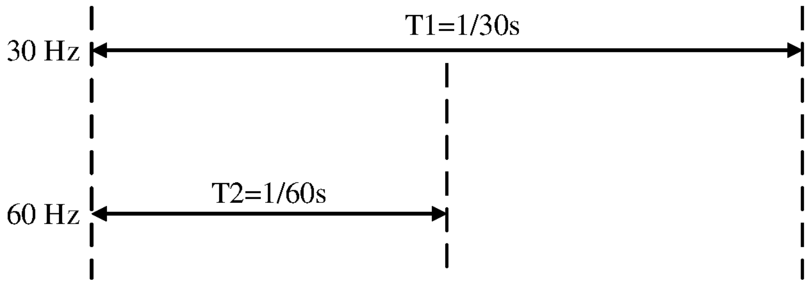
FIG. 4 is a diagram of a comparison between durations of an image frame at 60 Hz and 30 Hz according to some embodiments of this application.

In this case, when the display 10 is used to display an animation, a refresh rate of 60 Hz may be used. As shown in FIG. 4, a time T2 of an image frame is 1/60 s. To reduce power consumption of the electronic device 01, when the display 10 of the electronic device 01 is used to display a static image, for example, a standby image, a refresh rate less than 60 Hz, for example, 30 Hz, may be used. In this case, as shown in FIG. 4, a time T1 of an image frame is 1/30 s. T1>T2.

Therefore, when the display 10 uses a relatively low refresh rate, a time of an image frame is increased. Therefore, for a same row of sub-pixels 20, when the refresh rate of 30 Hz is used, duration Δt1 in which the row of sub-pixels 20 keeps emitting light, that is, duration of the third phase ③ in FIG. 3, is approximately 1/30 s. When the refresh rate of 60 Hz is used, duration Δt2 in which the row of sub-pixels 20 keeps emitting light is approximately 1/60 s. Δt1 is greater than Δt2.

In view of this, when a sub-pixel 20 emits light, an electric quantity Q of a first capacitor Cst in a pixel circuit 201 of the sub-pixel 20 meets the following formula:

$$Q=C\times\Delta V=I_{off\_M1}\times\Delta t \quad (2)$$

In the formula (2), C is a capacitance value of the first capacitor Cst, $I_{off\_M1}$ is a leakage current of the first reset transistor M1 in the third phase ③, namely, the light emitting phase, ΔV is a voltage drop (voltage drop) of the gate voltage Vg4 of the driving transistor M4 in the third phase ③, and Δt is duration in which the sub-pixel keeps emitting light.

It can be learned from the foregoing descriptions that Δt1 is greater than Δt2. Therefore, when the capacitance value C of the first capacitor Cst and the leakage current $I_{off\_M1}$ of the first reset transistor M1 are constant, it can be learned from the formula (2) that a voltage drop ΔV1 of the gate voltage Vg4 of the driving transistor M4 when the display 10 performs display at 30 Hz is greater than a voltage drop ΔV2 of the gate voltage Vg4 of the driving transistor M4 when the display 10 performs display at 60 Hz.

Figure 5:
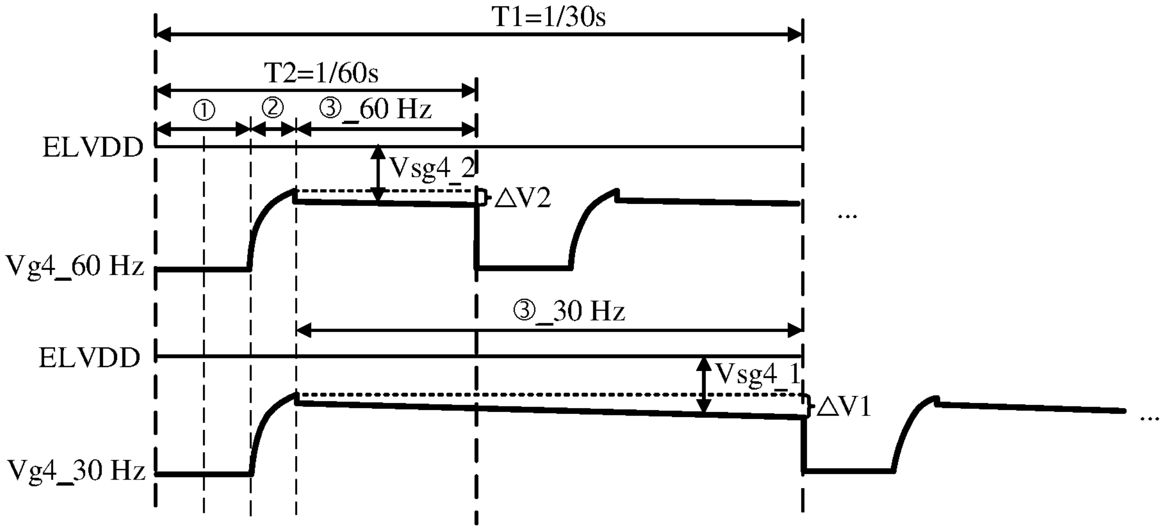
FIG. 5 is a diagram of comparisons between gate voltages of a driving transistor and between gate-source voltages of the driving transistor at 60 Hz and 30 Hz according to some embodiments of this application.

In view of this, as shown in FIG. 5, the gate-source voltage Vsg4 of the driving transistor M4 meets Vsg4=Vs4−Vg4. It can be learned from FIG. 2a that Vs=ELVDD. Therefore, when Vs4 remains unchanged, because ΔV1>ΔV2, a gate-source voltage Vsg4_1 of the driving transistor M4 when the display 10 performs display at 30 Hz is greater than a gate-source voltage Vsg4_2 of the driving transistor M4 when the display 10 performs display at 60 Hz, that is, Vsg4_1>Vsg4_2.

In this case, it can be learned from the formula (1) that the current Isd driving the OLED to emit light is directly proportional to a second power of the gate-source voltage Vsg4 of the driving transistor M4. Therefore, because Vsg4_1>Vsg4_2, a current Isd1 driving the OLED to emit light when the display 10 performs display at 30 Hz is greater than a current Isd2 driving the OLED to emit light when the display 10 performs display at 60 Hz, that is, Isd1>Isd2. Therefore, when the display 10 switches from a higher refresh rate of 60 Hz to a lower refresh rate of 30 Hz for display, the current flowing through the OLED in the sub-pixel 20 increases. In this case, at a time at which the refresh rates are alternated, brightness of the OLED suddenly increases, and a human eye keenly captures the sudden change of brightness, thereby causing a display flicker phenomenon.

Based on the foregoing cause of display flicker on the display 10, this embodiment of this application provides a method for reducing an occurrence probability of a display flicker phenomenon. It can be learned from the formula (2) that, when the display 10 performs display at the low refresh rate of 30 Hz, the duration Δt in which the sub-pixel 20 keeps emitting light increases. In this case, the leakage current $I_{off\_M1}$ of the first reset transistor M1 may be reduced to keep a value on a left side of the formula (2) unchanged.

Therefore, a value of the voltage drop ΔV1 of the gate voltage Vg4 of the driving transistor M4 in the third phase ③ when the display 10 performs display at the low refresh rate of 30 Hz is approximately equal to a value of the voltage drop ΔV2 of the gate voltage Vg4 of the driving transistor M4 when the display 10 performs display at 60 Hz.

In view of this, it can be learned from FIG. 5 that, when the values of ΔV1 and ΔV2 are approximately equal, the gate-source voltage Vsg4_1 of the driving transistor M4 when the display 10 performs display at 30 Hz is approximately equal to the gate-source voltage Vsg4_2 of the driving transistor M4 when the display 10 performs display at 60 Hz.

Further, it can be learned from the formula (1) that the current Isd1 driving the OLED to emit light when the display 10 performs display at 30 Hz is approximately equal to the current Isd2 driving the OLED to emit light when the display 10 performs display at 60 Hz. Therefore, when the display 10 switches from a higher refresh rate of 60 Hz to a lower refresh rate of 30 Hz for display, the current flowing through the OLED in the sub-pixel 20 remains basically unchanged, thereby effectively reducing an occurrence probability of a display flicker phenomenon.

Figure 6:
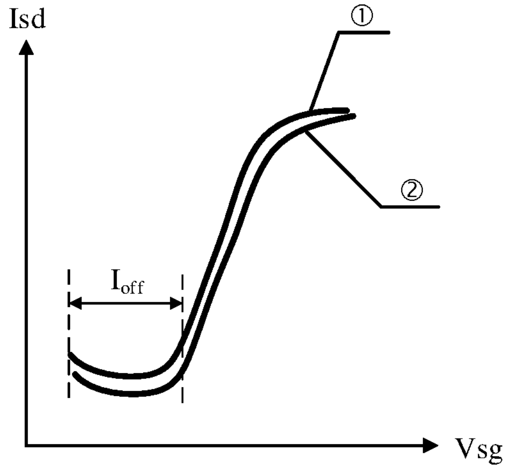
FIG. 6 is a schematic diagram of I-V curves of a transistor according to some embodiments of this application.

To sum up, to effectively resolve the display flicker problem, the leakage current $I_{off\_M1}$ of the first reset transistor M1 in the pixel circuit 201 needs to be reduced. In view of this, it can be learned from I-V curves of a transistor in FIG. 6 that source-drain voltages Vsd of the transistor at all locations on each curve are equal. For example, a curve ① corresponds to a source-drain voltage Vsd1 of the transistor, and a curve ② corresponds to a source-drain voltage Vsd2 of the transistor.

The curve ① is above the curve ②. Therefore, Vsd1>Vsd2. In this case, a leakage current $I_{off\_1}$ of the transistor that corresponds to the curve ① is greater than a leakage current $I_{off\_2}$ corresponding to the curve ②. Therefore, to reduce the leakage current $I_{off\_M1}$ of the first reset transistor M1 in the light emitting phase, namely, the third phase ③ in FIG. 3, a source-drain voltage Vsd1 of the first reset transistor M1 may be reduced in the third phase ③.

It should be noted that, as shown in FIG. 2a, transistors connected to the driving transistor M4 include the first reset transistor M1 and the transistor M3. Therefore, both the leakage current of the first reset transistor M1 and a leakage current of the transistor M3 cause a voltage drop ΔV of the gate voltage Vg4 of the driving transistor M4 within the time in which the sub-pixel 20 keeps emitting light. However, because the voltages at the drain d and the gate g of the driving transistor M4 can be the same when the transistor M3 is on in the second phase ②, a source-drain voltage Vsd3 of the transistor M3 is relatively small after the transistor M3 is cut off in the third phase ③. Therefore, a generated leakage current is also relatively small, and impact on the gate voltage Vg4 of the driving transistor M4 is relatively small.

However, it can be learned from the operating process of the pixel circuit 201 that, in the third phase ③, the source-drain voltage Vsd1 of the first reset transistor M1 meets Vsd1=Vdata−|Vth_M4|−Vint. For example, Vint may be −4 V. Therefore, because the source-drain voltage Vsd1 of the first reset transistor M1 is relatively large, a generated leakage current is also relatively large, and impact on the gate voltage Vg4 of the driving transistor M4 is relatively large. Therefore, in the following embodiment, the source-drain voltage Vsd1 of the first reset transistor M1 is reduced to achieve an objective of reducing an occurrence probability of a display flicker phenomenon. The following describes a structure of the display 10 in which the source-drain voltage Vsd1 of the first reset transistor M1 can be described.

It should be noted that, in the foregoing embodiment, reducing the source-drain voltage Vsd1 of the first reset transistor M1 to achieve an objective of mitigating display flicker is described by using an example in which the pixel circuit 201 has the 7T1C structure shown in FIG. 2a. A structure of the pixel circuit 201 is not limited in this application, provided that it can be ensured that the pixel circuit 201 has the driving transistor M4 and the first reset transistor M1.

Figure 7A:
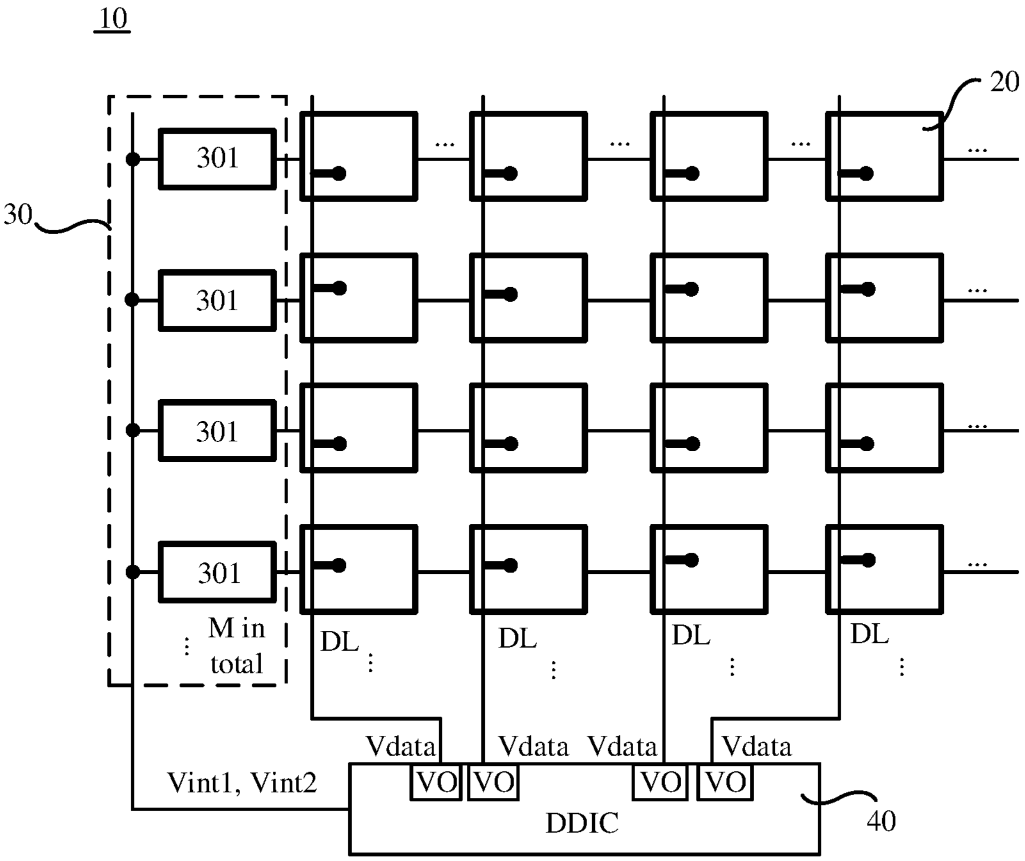
FIG. 7*a* is a schematic diagram of a structure of a display module according to an embodiment of this application.

The display module provided in this embodiment of this application further includes at least one driver group 30 and a display drive circuit 40 that are disposed in the non-display area 101, as shown in FIG. 7a. In some embodiments of this application, the display drive circuit 40 may be a display driver integrated circuit (display driver integrated circuit, DDIC). The DDIC has a data voltage output VO configured to output a data voltage Vdata. In this case, in the data voltage writing phase (the second phase ② shown in FIG. 3), the data voltage input coupled to the first node, for example, the source s, of the driving transistor M4 is the data voltage output port VO of the DDIC.

The DDIC is coupled to the AP through a flexible printed circuit (flexible printed circuit, FPC) board shown in FIG. 1a, so that the DDIC can receive display data output by the AP. The data voltage output port VO of the DDIC is coupled to a data line (data line, DL) in the display area 100. The DL is coupled to a first node of the transistor M2 in FIG. 2a, so that the data line Vdata output by the DDIC can be transmitted to a pixel circuit 201 of each sub-pixel 20 through the DL.

Figure 7B:
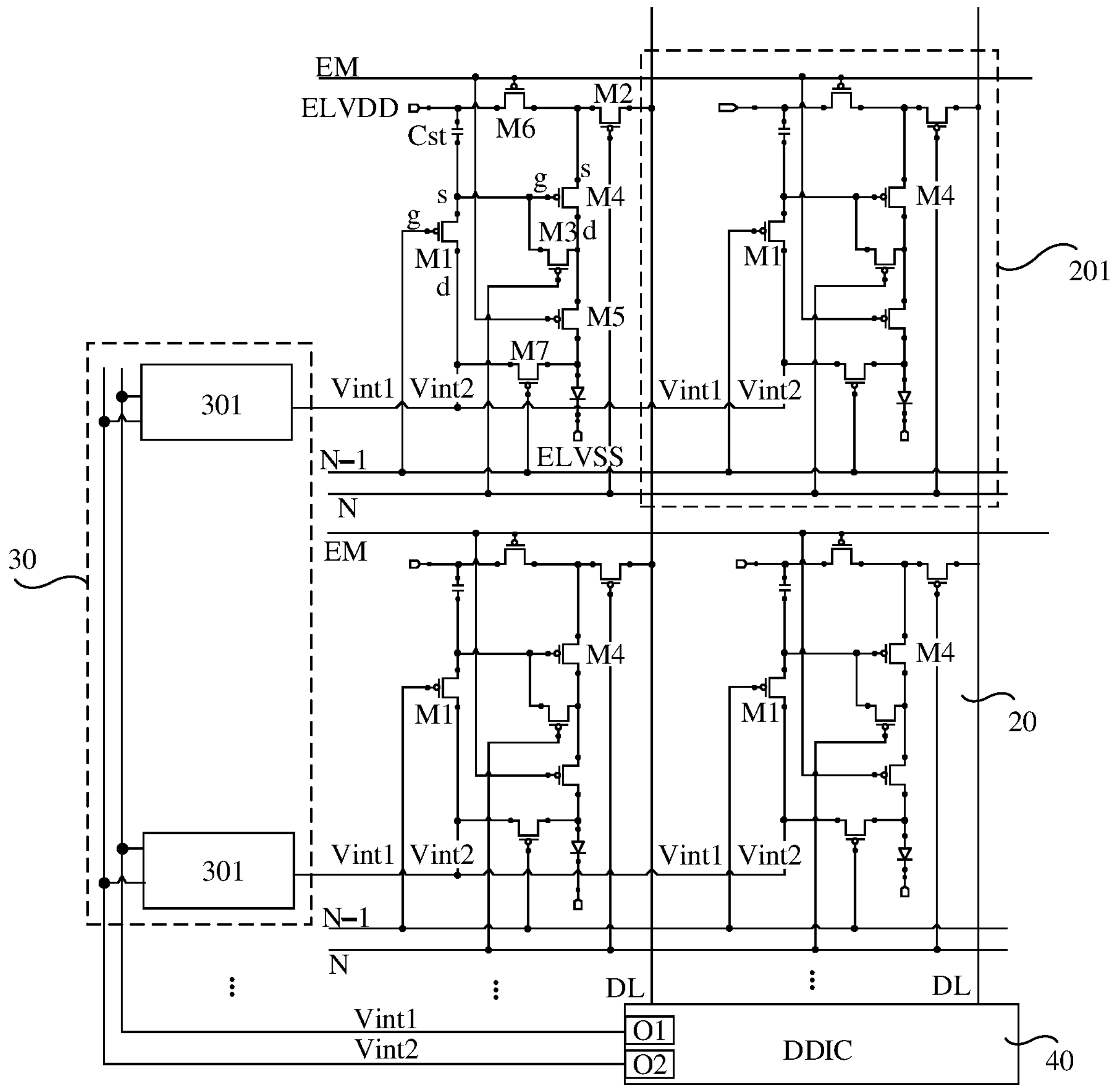
FIG. 7*b* is a schematic diagram of a structure of a display with a pixel circuit shown in FIG. 2*a* according to an embodiment of this application.
Figure 7C:
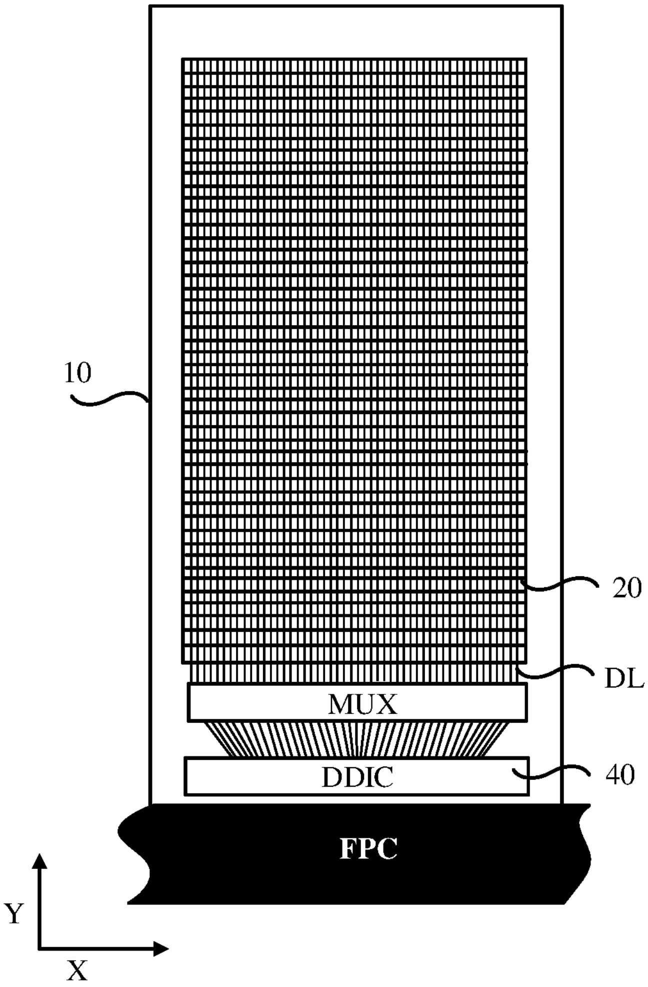
FIG. 7*c* shows a coupling manner of a data line and a display drive circuit according to an embodiment of this application.

It should be noted that, in this embodiment of this application, as shown in FIG. 7c, one end of each data line DL is coupled to a first node of a transistor M2 (as shown in FIG. 2a) in one column of sub-pixels 20 (along the vertical direction Y), and the other end of each data line DL may be coupled to the data voltage output VO (as shown in FIG. 7a) of the DDIC (namely, the display drive circuit 40) through a multiplexer (multiplexer, MUX) circuit. In a time period, the MUX may select only some data lines DLs according to a requirement to respectively receive data voltages Vdata output by data voltage outputs VO of the DDIC.

Figure 7D:
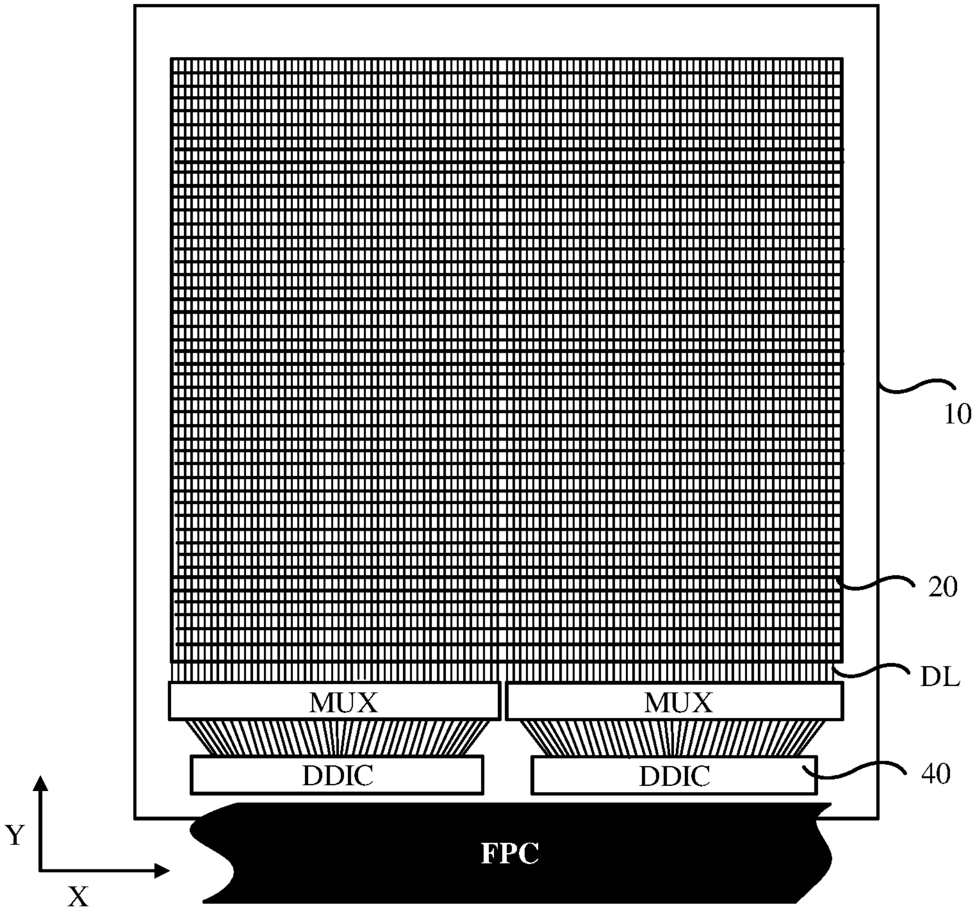
FIG. 7*d* shows another coupling manner of a data line and a display drive circuit according to an embodiment of this application.

In some embodiments of this application, when a size of the display 10 is relatively large and a quantity of sub-pixels in a row (along the horizontal direction X) is relatively large, a quantity of data lines DLs disposed in the display 10 also increases. In this case, the electronic device 01 may include a plurality of MUXs and a plurality of DDICs. As shown in FIG. 7d, some data lines DLs in the display 10 are coupled to data voltage outputs VO of one DDIC through one MUX. In addition, the driver group 30 includes M selecting circuits 301. Each selecting circuit 301 is coupled to the display drive circuit 40. The selecting circuit 301 is configured to receive a first initial voltage Vint1 and a second initial voltage Vint2 that are output by the display drive circuit 40, where |Vint2|>|Vint1|.

In some embodiments of this application, as shown in FIG. 7b, the display drive circuit 40 has a first signal terminal O1 and a second signal terminal O2. The first signal terminal O1 may output the first initial voltage end Vint1. The second signal terminal O2 is configured to output the second initial voltage Vint2.

In addition, as shown in FIG. 7b, the $N^{th}$ (for example, N=1) selecting circuit 301 is coupled to a second node, for example, a drain d, of a first reset transistor M1 in a pixel circuit 201 of the $N^{th}$ (for example, N=1) row of sub-pixels 20. The selecting circuit 301 is further configured to output the second initial voltage Vint2 to the second node, for example, the drain d, of the first reset transistor M1 when the pixel circuit 201 is in a reset phase (the first phase ① in FIG. 3) and a data voltage writing phase (the second phase ② in FIG. 3).

Therefore, in the reset phase (the first phase ① in FIG. 3), when the first reset transistor M1 is on, the second initial voltage Vint2 may be transmitted to a gate of a driving transistor M4, to reset the gate of the driving transistor M4.

In addition, when the pixel circuit 201 includes a second reset transistor M7 and an OLED and the second reset transistor M7 is on, the second initial voltage Vint2 may be further transmitted to an anode of the OLED, to reset the anode of the OLED.

In addition, in the data voltage writing phase (the second phase ② in FIG. 3), because a transistor M3 is on, a gate g voltage Vg4 of the driving transistor M4 and a source s voltage Vs1 of the first reset transistor M1 are equal to Vdata−|Vth_M4|.

In this case, a source-drain voltage Vsd1_A of the first reset transistor M1 meets Vsd1_A=Vdata−|Vth_M4|−Vint2. In some embodiments of this application, Vint2=−4 V. The source-drain voltage Vsd1_A of the first reset transistor M1 meets Vsd1_A=Vdata−|Vth_M4|−(−4)=Vdata−|Vth_M4|+4.

In addition, the selecting circuit 301 is further configured to output the first initial voltage Vint1 to the second node, for example, the drain d, of the first reset transistor M1 when the pixel circuit 201 is in a light emitting phase (the third phase ③ in FIG. 3). 1≤N≤M, and N is a positive integer.

Therefore, in the light emitting phase (the third phase ③ in FIG. 3), because the selecting circuit 301 outputs the first initial voltage Vint1 to the second node, for example, the drain d, of the first reset transistor M1, a source-drain voltage Vsd1_B of the first reset transistor M1 in the light emitting phase meets Vsd1_B=Vdata−|Vth_M4|−Vint1. Because |Vint2|>|Vint1|, Vsd1_B<Vsd1_A.

In this case, the source-drain voltage Vsd1 of the first reset transistor M1 may be reduced in the light emitting phase, to reduce a leakage current $I_{off\_M1}$ of the first reset transistor M1 in the light emitting phase. When a low refresh rate is used for display, a probability that a display flicker phenomenon occurs because the gate voltage Vg4 of the driving transistor M4 undergoes a relatively large voltage drop in the light emitting phase due to the leakage current can be reduced.

In some embodiments of this application, a value range of the first initial voltage Vint1 may be 0 to 2 V. When the first initial voltage Vint1 is less than 0 V, a difference between Vsd1_B and Vsd1_A is relatively small in the light emitting phase. As a result, the leakage current $I_{off\_M1}$ of the first reset transistor M1 cannot be effectively reduced in the light emitting phase, and an effect of eliminating a display flicker phenomenon is degraded. In addition, when the first initial voltage Vint1 is greater than 2 V, a leakage current of the second reset transistor M7 flows to the OLED. As a result, when the sub-pixels are displayed as a black image, the OLED emits light, causing a light leakage phenomenon.

In view of this, in some embodiments of this application, the first initial voltage Vint1 may be 0 V, 1 V, or 2 V.

Figure 8A:
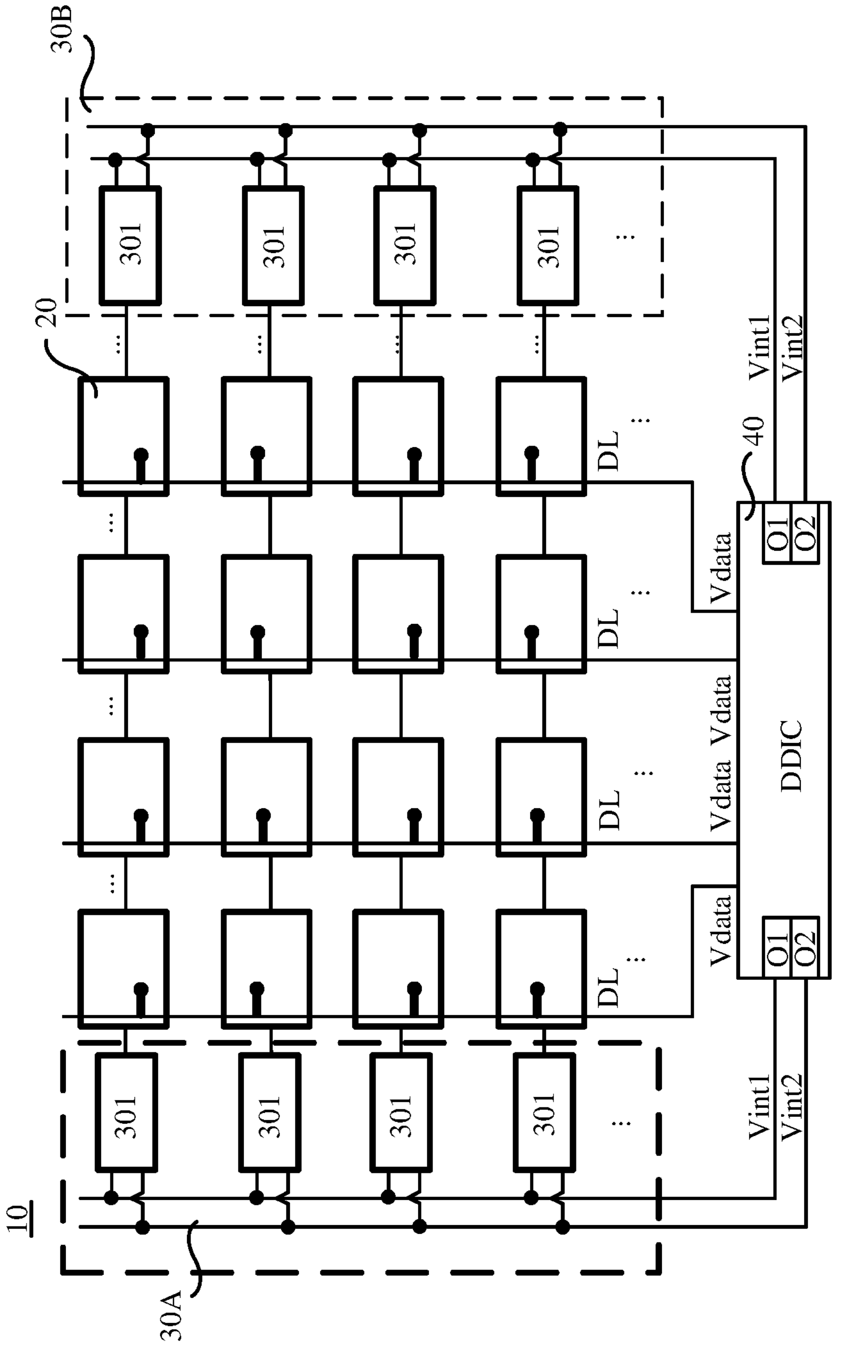
FIG. 8*a* is a schematic diagram of a structure of another display module according to an embodiment of this application.

On this basis, the display module includes a first driver group 30A and a second driver group 30B shown in FIG. 8*a*. The first driver group 30A and the second driver group 30B are respectively located on a left side and a right side of the display area 100 of the display.

Figure 8B:
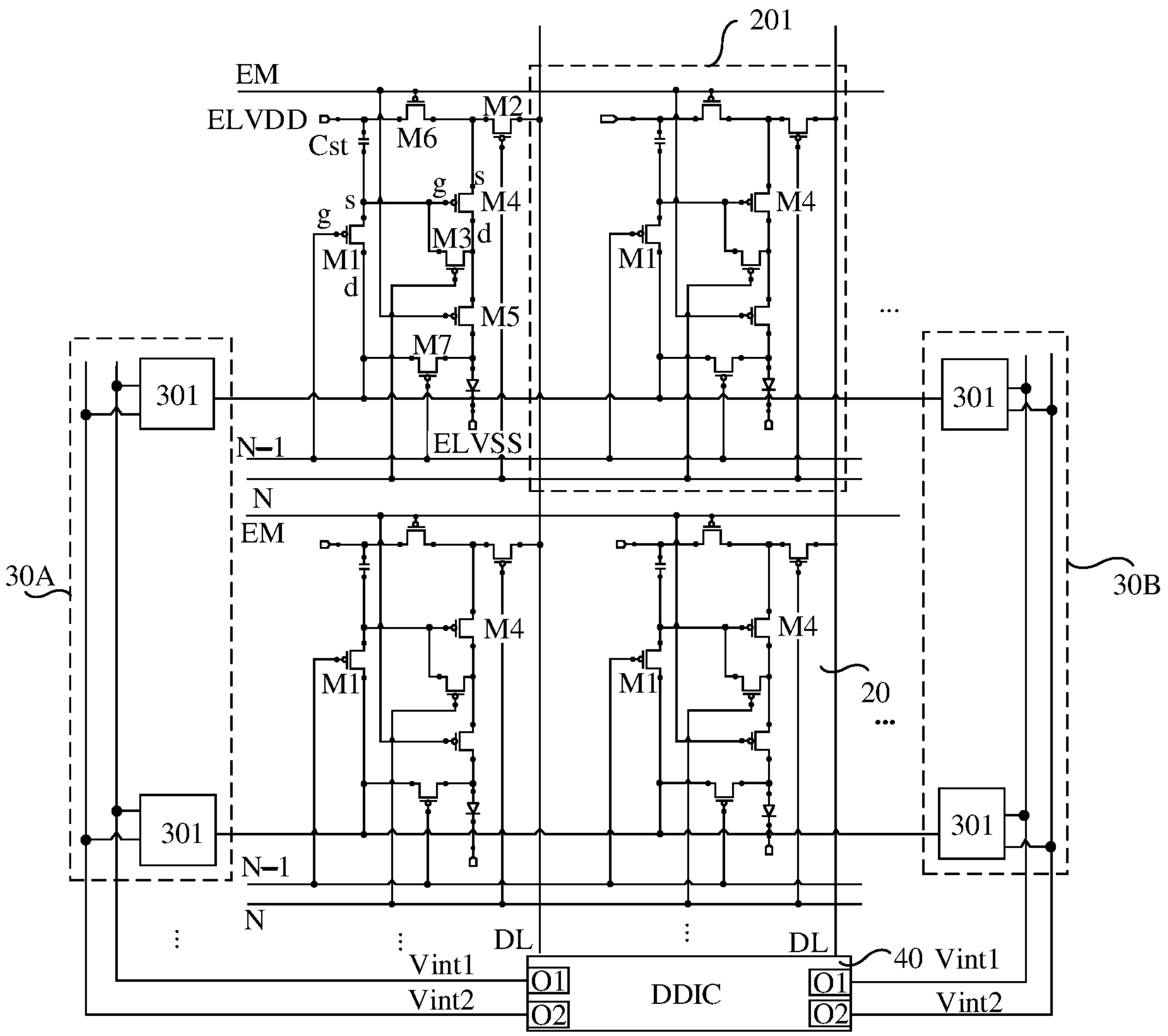
FIG. 8*b* is a schematic diagram of another structure of a display with a pixel circuit shown in FIG. 2*a* according to an embodiment of this application.

In view of this, as shown in FIG. 8*b*, both the $N^{th}$ (for example, N=1) selecting circuit 301 in the first driver group 30A and the $N^{th}$ (for example, N=1) selecting circuit 301 in the second driver group 30B are coupled to the second node, for example, the drain d, of the first reset transistor M1 in the pixel circuit 201 of the $N^{th}$ (for example, N=1) row of sub-pixels 20.

In this case, when the display 10 has a relatively high resolution, a quantity of sub-pixels 20 in a row is relatively large. If the driver group 30 is disposed only on a left side or a right side of the row of sub-pixels 20, a signal received at an end, of the row of sub-pixels 20, that is farther away from an output of a selecting circuit 30 in the driver group 30 is attenuated, thereby reducing signal accuracy.

Therefore, the first driver group 30A and the second driver group 30B are respectively disposed on the left side and the right side of the display area 100, so that a selecting circuit 301 in the first driver group 30A and a selecting circuit 301 in the second driver group 30B provide the first initial voltage Vint1 and the second initial voltage Vint2 to a second node, for example, a drain d, of each first reset transistor M1 in a same row of sub-pixels 20 from the left side and the right side respectively, thereby effectively reducing signal attenuation.

The following describes a structure of the selecting circuit 301 in the driver group 30 and a structure of the display 10 with the selecting circuit 301 by using different examples.

Example 1

Figure 9A:
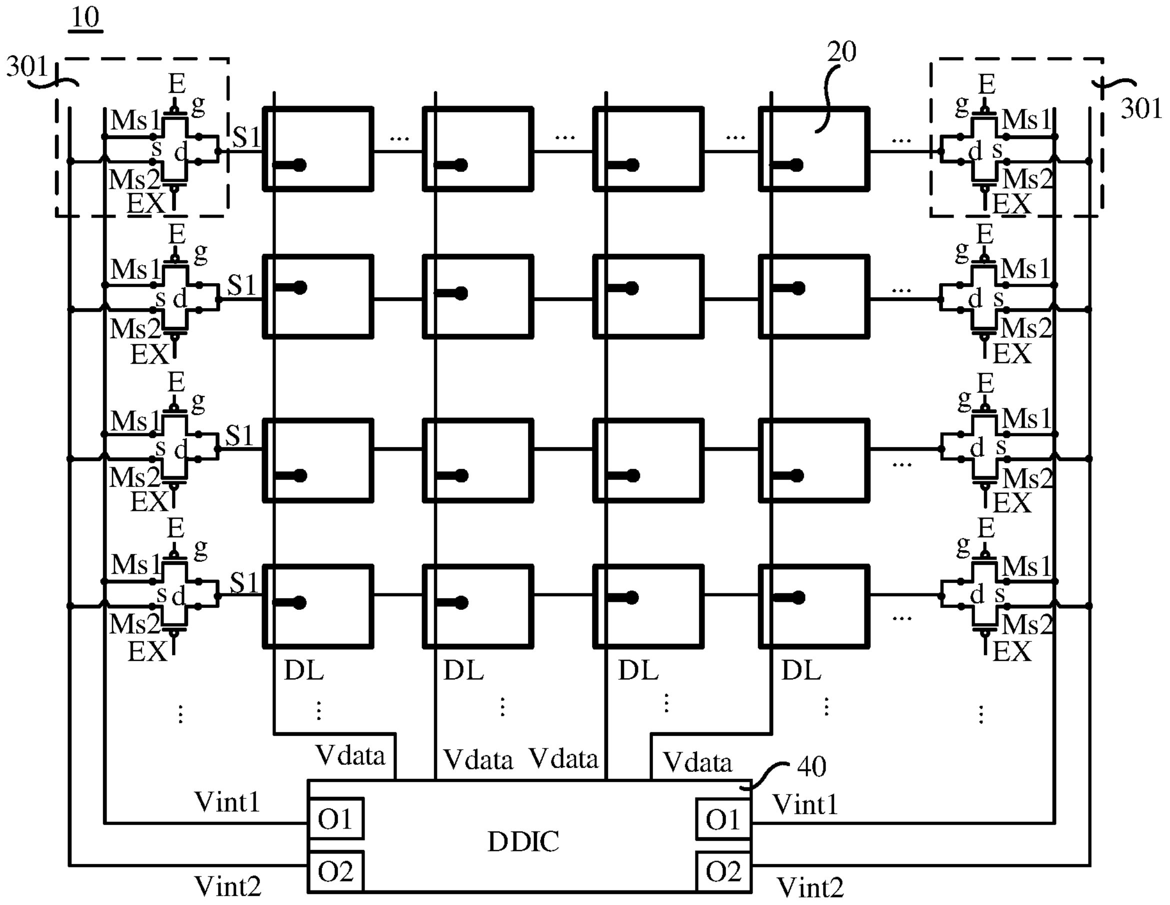
FIG. 9*a* is a schematic diagram of a structure of another display module according to an embodiment of this application.
Figure 9B:
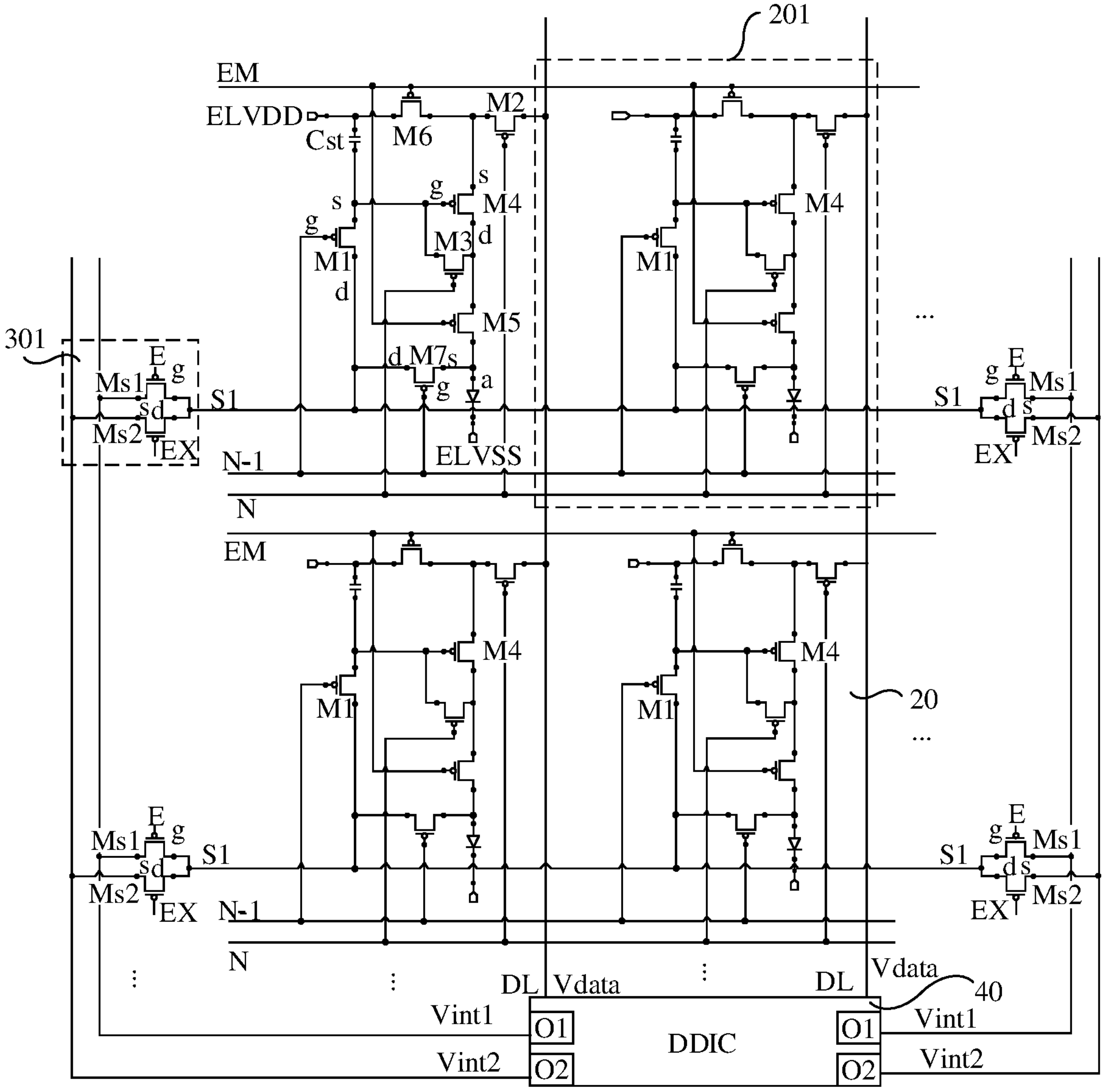
FIG. 9*b* is a schematic diagram of another structure of a display with a pixel circuit shown in FIG. 2*a* according to an embodiment of this application.

In this example, as shown in FIG. 9*a*, the display 10 further includes M first initial voltage lines S1. Each selecting circuit 301 includes a first selecting transistor Ms1 and a second selecting transistor Ms2. In addition, as shown in FIG. 9*b*, the $N^{th}$ (for example, N=1) first initial voltage line S1 is coupled to the second node, for example, the drain d, of the first reset transistor M1 in the pixel circuit 201 of the $N^{th}$ (for example, N=1) row of sub-pixels 20.

It should be noted that a first node of the first selecting transistor Ms1 may be a source s, and a second node may be a drain d; or the first node of the first selecting transistor Ms1 may be the drain d, and the second node may be the source s. For ease of description, this embodiment of this application is described by using an example in which the first node of the first selecting transistor Ms1 is the source s and the second node is the drain d. Similarly, a first node of the second selecting transistor Ms2 may be a source s, and a second node may be a drain d; or the first node of the second selecting transistor Ms2 may be the drain d, and the second node may be the source s. For ease of description, this embodiment of this application is described by using an example in which the first node of the second selecting transistor Ms2 is the source s and the second node is the drain d.

In addition, a first node, for example, a source s, of a first selecting transistor Ms1 in the $N^{th}$ (for example, N=1) selecting circuit 301 is coupled to the display drive circuit 40. The display drive circuit 40 may have a first signal terminal O1 and a second signal terminal O2. The first node, for example, the source s, of the first selecting transistor Ms1 is coupled to the first signal terminal O1 of the display drive circuit 40, and is configured to receive the first initial voltage Vint1 output by the first signal terminal O1 of the display drive circuit 40.

A second node, for example, a drain d, of the first selecting transistor Ms1 is coupled to the $N^{th}$ (for example, N=1) first initial voltage line S1. A gate g of the first selecting transistor Ms1 is configured to receive a first selecting signal E.

A first node, for example, a source s, of a second selecting transistor Ms2 in the $N^{th}$(for example, N=1) selecting circuit 301 is coupled to the display drive circuit 40. The display drive circuit 40 may have a first signal terminal O1 and a second signal terminal O2. The first node, for example, the source s, of the second selecting transistor Ms2 is coupled to the second signal terminal O2 of the display drive circuit 40, and is configured to receive the second initial voltage Vint2 output by the second signal terminal O2 of the display drive circuit 40.

A second node, for example, a drain d, of the second selecting transistor Ms2 is coupled to the $N^{th}$ (for example, N=1) first initial voltage line S1. A gate g of the first selecting transistor Ms1 is configured to receive a second selecting signal XE. The second selecting signal XE is a reverse-phase signal of the first selecting signal E.

Figure 10:
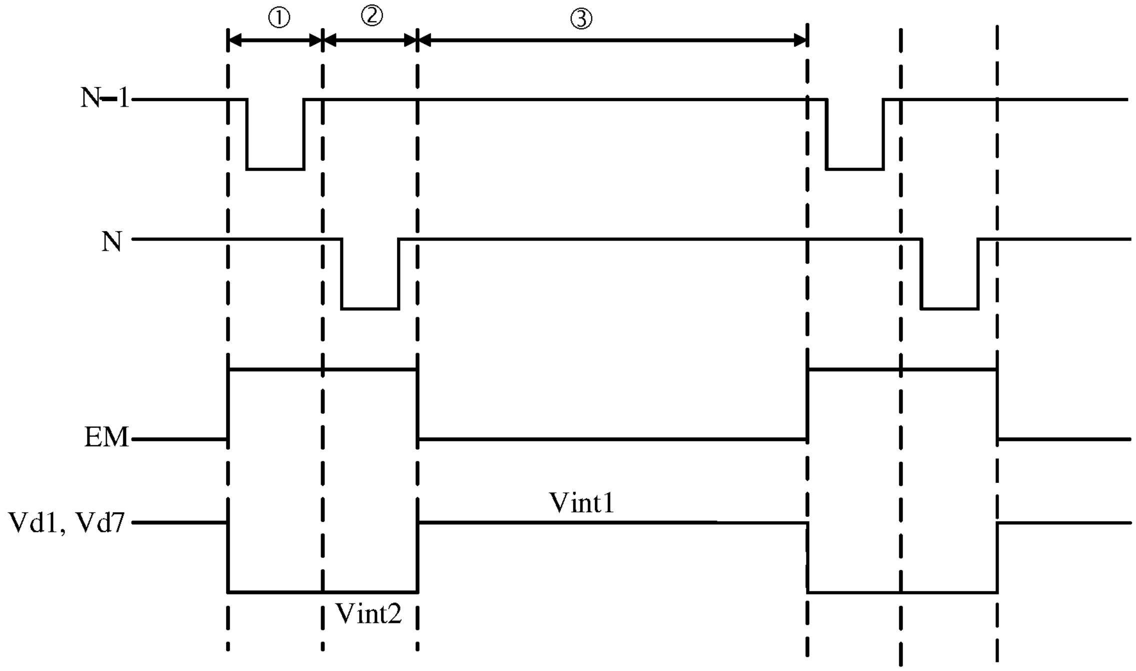
FIG. 10 is a signal sequence diagram according to an embodiment of this application.

In this case, with reference to the sequence diagrams shown in FIG. 3 and FIG. 10 respectively, drain voltages Vd1 and source-drain voltages Vsd1 of first reset transistors M1 and drain voltages Vd7 of second reset transistors M7 in the pixel circuits shown in FIG. 2*a* and FIG. 9*b* at each phase are obtained, as shown in Table 1.

TABLE 1

| | Pixel circuit shown in FIG. 2a | | Pixel circuit shown in FIG. 9b | |
|---|---|---|---|---|
| | Vd1 and Vd7 (unit: V) | Vsd1 (unit: V) | Vd1 and Vd7 (unit: V) | Vsd1 (unit: V) |
| First phase ① | Vint = −4 | 0.1 | Vint2 = −4 | 0.1 |
| Second phase ② | Vint = −4 | Vdata − \|Vth_M4\| − (−4) | Vint2 = −4 | Vdata − \|Vth_M4\| − (−4) |
| Third phase ③ | Vint = −4 | | Vint1 = 1 | Vdata − \|Vth_M4\| − 1 |

It can be learned from Table 1 that, in the first phase ①, namely, the reset phase, the first reset transistor M1 is on, and the drain voltage Vd1 of the first reset transistor M1 meets Vd1=Vint=Vint2=−4 V. In this case, under impact of a resistance of the first reset transistor M1, the source s voltage Vs1 of the first reset transistor M1 is less than −4 V. For example, Vs1 may be −3.9 V. In this case, the source-drain voltage Vsd1 of the first reset transistor M1 meets Vsd1=Vs1−Vd1=−3.9−(−4)=0.1 V.

In addition, as shown in FIG. 9*b*, the pixel circuit 201 further includes a second reset transistor M7. A gate g of the second reset transistor M7 and the gate of the first reset transistor M1 are coupled, and are both configured to receive a selecting signal N−1. Therefore, in the first phase (shown in FIG. 3, when the selecting signal N−1 is an active signal, both the first reset transistor M1 and the second reset transistor M7 may be turned on.

On this basis, a first node, for example, a source s, of the second reset transistor M7 is coupled to the anode a of the OLED. In addition, a second node, for example, a drain d, of a second reset transistor M7 in the pixel circuit 201 of the $N^{th}$ (for example, N=1) row of sub-pixels 20 is coupled to the $N^{th}$ (for example, N=1) first initial voltage line S1.

Therefore, in the first phase ①, the first reset transistor M1 and the second reset transistor M7 are turned on, the first initial voltage line S1 transmits the second initial voltage Vint2 with a larger value to the gate g of the driving transistor M4 through the first reset transistor M1, and transmits the second initial voltage Vint2 to the anode a of the OLED through the second reset transistor M7. Therefore, the gate g of the driving transistor M4 and the anode a of the OLED can be reset by using the first reset transistor M1 and the second reset transistor M7 respectively.

In the second phase ②, namely, the data voltage writing phase, the first reset transistor M1 is off, and the drain voltage Vd1 of the first reset transistor M1 meets Vd1=Vint=Vint2=−4 V. In this case, it can be learned from the foregoing descriptions that the transistor M3 in the pixel circuit 201 is on. Therefore, the source-drain voltage Vsd1 of the first reset transistor M1 meets Vsd1=Vdata−|Vth_M4|−(−4)

In addition, in the third phase, namely, the light emitting phase, the first reset transistor M1 is off. Compared with the solution shown in FIG. 2*a*, when the solution shown in FIG. 9*b* is used, the drain voltage Vd1 of the first reset transistor M1 and the drain voltage Vd7 of the second reset transistor M7 meet Vd1=Vd7=Vint1=1 V. Therefore, the source-drain voltage Vsd1 of the first reset transistor M1 meets Vsd1=Vdata−|Vth_M4|−1<Vdata−|Vth_M4|−(−4).

In view of this, when the OLED emits light, the source-drain voltage Vsd1 of the first reset transistor M1 may be reduced to reduce the leakage current $I_{off\_M1}$ of the first reset transistor M1. Therefore, when a high refresh rate, for example, 60 Hz, is switched to a low refresh rate, for example, 30 Hz, a relatively large voltage drop of the gate voltage Vg4 of the driving transistor M4 in the light emitting phase due to the leakage current can be reduced, so that light emitting brightness of the sub-pixels 20 displayed at 30 Hz is close to that of the sub-pixels 20 displayed at 60 Hz. Therefore, when the refresh rates are alternated, a probability of a sudden increase of display brightness can be reduced, so that a human eye cannot keenly capture a brightness change, and an occurrence probability of a display flicker phenomenon is reduced.

It should be noted that the foregoing descriptions are provided by using an example in which Vint1=1 V. It can be learned from the foregoing descriptions that Vint1 may be selected within a range of 0 V to 2 V.

In addition, the foregoing descriptions are provided by using an example in which the first reset transistor M1, the second reset transistor M7, and the driving transistor M4 in the pixel circuit 201 of the sub-pixel 20 are P-channel metal oxide semiconductor (positive channel metal oxide semiconductor, PMOS) field effect transistors. In this case, a first node of the transistor is a source s, and a second node is a drain d. In addition, when a gate g of the transistor receives a low level, the transistor is in an on state. When the gate g of the transistor receives a high level, the transistor is in an off state.

Figure 9C:
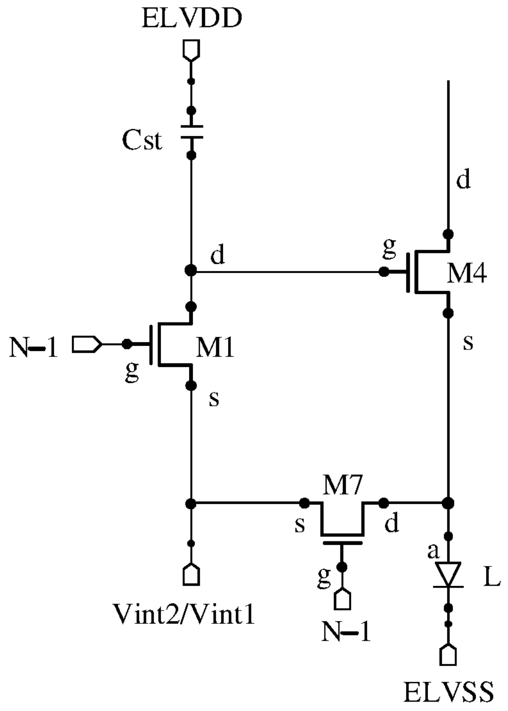
FIG. 9*c* is a schematic diagram of a partial structure of another pixel circuit according to an embodiment of this application.

In some other embodiments of this application, for example, as shown in FIG. 9*c*, the first reset transistor M1, the second reset transistor M7, and the driving transistor M4 in the pixel circuit 201 may be N-channel metal oxide semiconductor (negative channel metal oxide semiconductor, NMOS) field effect transistors. In this case, a first node of the transistor is a drain d, and a second node is a source s. In addition, when a gate g of the transistor receives a high level, the transistor is in an on state. When the gate g of the transistor receives a low level, the transistor is in an off state.

In this example, when the first reset transistor M1 and the second reset transistor M7 are N-channel transistors, a manner of setting the first initial voltage Vint1 and the second initial voltage Vint2 may be similar. For example, the source voltage Vs1 of the first reset transistor M1 and the source voltage Vs7 of the second reset transistor M7 in the first phase (and the second phase ② may be Vint2, and Vint2=−4 V. The source voltage Vs1 of the first reset transistor M1 and the source voltage Vs7 of the second reset transistor M7 in the third phase ③ may be Vint1, and Vint1=1V.

In this example, for ease of description, an example in which the first reset transistor M1, the second reset transistor M7, and the driving transistor M4 are P-channel transistors is used for description below.

Figure 11:
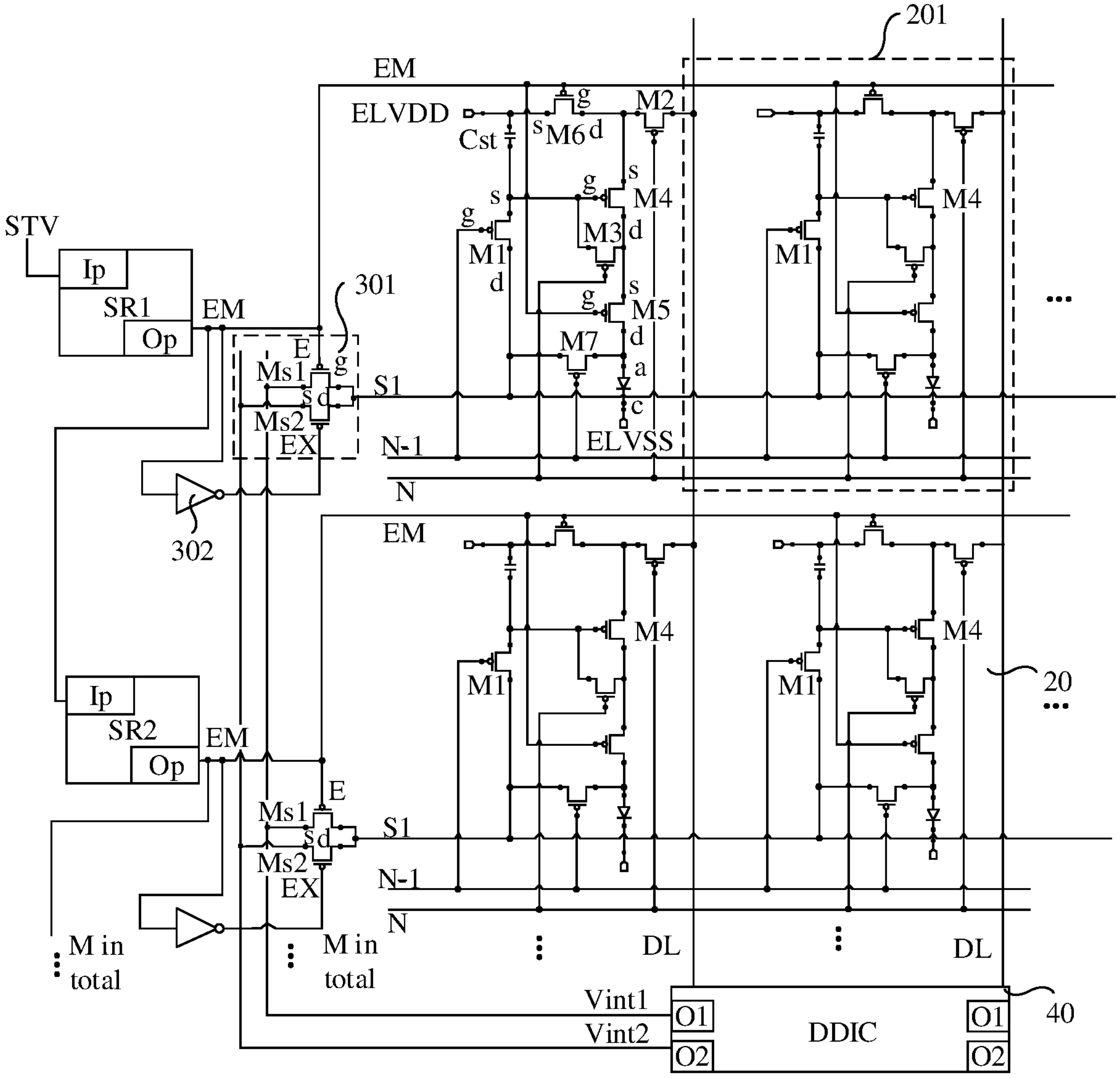
FIG. 11 is a schematic diagram of a structure of another display module according to an embodiment of this application.

In some embodiments of this application, to output the first initial voltage Vint1 and the second initial voltage Vint2 to a drain d of a first reset transistor M1 in a sub-pixel 20 row by row, the driver group 30 further includes M phase inverters 302 and M cascaded shift registers (shift register, SR) shown in FIG. 11.

An output Op of the $N^{th}$ (for example, N=1) SR is coupled to an input of the $N^{th}$ (for example, N=1) phase inverter 302 and the gate g of the first selecting transistor Ms1 in the $N^{th}$(for example, N=1) selecting circuit 301. The output Op of the SR is configured to output the first selecting signal E.

An output of the $N^{th}$ phase inverter 302 is coupled to the gate g of the second selecting transistor Ms2 in the $N^{th}$ selecting circuit 301. The output of the phase inverter 302 is configured to output the second selecting signal XE.

In this case, when a plurality of SRs are cascaded in sequence, for example, as shown in FIG. 11, a signal output (Output, Op for short) of a first-stage shift register, namely, an SR1, is coupled to a signal input (Input, Ip for short) of a second-stage shift register, namely, an SR2. The SR2 is adjacent to the SR1. The signal output Op of the SR2 is coupled to a signal input Ip of a third-stage shift register, namely, an SR3. The SR3 is adjacent to the SR2. In addition, a cascading manner of remaining SRs is the same as that described above.

The signal input Ip of the SR1 is configured to receive a start signal (start vertical frame signal, STV for short). In some embodiments of this application, when the STV has a high level (High voltage), the start signal STV is an active signal, and the SR1 starts to operate. When the STV has a low level (low voltage), the start signal STV is an inactive signal, and in this case, the SR1 does not operate.

In view of this, when the pixel circuit 201 is in the first phase ① and the second phase ②, the SR1 outputs an inactive signal, for example, a high level. In this case, the first selecting transistor Ms1 is off. In addition, after the high level undergoes a phase inversion action of the phase inverter 302, a gate of a second selecting transistor Ms2 in the $1^{st}$ selecting circuit 301 receives an active second selecting signal XE. The second selecting transistor Ms2 is turned on.

The second initial voltage Vint2 output by the second signal terminal O2 of the display drive circuit 40 is transmitted to a drain d of a first reset transistor M1 of each sub-pixel 20 in the $1^{st}$ row through the second selecting transistor Ms2. Therefore, as shown in Table 1, the source-drain voltage Vsd1 of the first reset transistor M1 may be 0.1 V in the first phase ①, and may meet Vsd1=Vdata−|Vth_M4|−(−4) in the second phase ②.

When the pixel circuit 201 is in the third phase ③, the SR1 outputs an active signal, for example, a low level. In this case, a first selecting transistor Ms1 in the $1^{st}$ selecting circuit 301 is turned on. After the signal output by the SR1 undergoes a phase inversion action of the phase inverter 302, the second selecting transistor Ms2 is cut off.

The first initial voltage Vint1 output by the first input O1 of the display drive circuit 40 is transmitted to the drain d of the first reset transistor M1 of each sub-pixel in the is row through the first selecting transistor Ms1. Therefore, as shown in Table 1, the source-drain voltage Vsd1 of the first reset transistor M1 in the third phase ③ may meet Vsd1=Vdata−|Vth_M4|−1.

In addition, when the SR1 outputs an active signal, the active signal may be further transmitted to the signal input Ip of the SR2 that is cascaded with the SR1. Therefore, by setting a circuit structure in the SR2, after the $1^{st}$ row of sub-pixels emits light, the SR2 controls a second selecting transistor Ms2 and a first selecting transistor Ms1 in the $2^{nd}$ selecting circuit 301 to be turned on, so that the $2^{nd}$ row of sub-pixels 201 emits light. Therefore, by using the plurality of cascaded SRs, a plurality of rows of sub-pixels 20 arranged in sequence can be scanned row by row, so that the sub-pixels 20 emit light row by row.

It should be noted that, in FIG. 11, a plurality of phase inverters 302 and a plurality of cascaded SRs are shown only on the left side of the display area 100. It can be learned from the foregoing descriptions that, when the selecting circuit 301 is also disposed on the right side of the display area 100, to control a first selecting transistor Ms1 and a second selecting transistor Ms2 in the selecting circuit 301 to be turned on and cut off, a plurality of phase inverters 302 and a plurality of cascaded SRs may also be disposed on the right side of the display area 100. A disposing manner is the same as that described above. Details are not described herein again.

It can be learned from the foregoing descriptions that, when the pixel circuit 201 includes a first light emitting control transistor M6 and a second light emitting control transistor M5 shown in FIG. 11, gates g of the first light emitting control transistor M6 and the second light emitting control transistor M5 are both configured to receive a light emitting control signal EM. Therefore, in the third phase ③, the first light emitting control transistor M6 and the second light emitting control transistor M5 can be turned on, so that the current path between the first power voltage ELVDD and the second power voltage ELVSS is turned on, and the driving current provided by the driving transistor M4 can flow through the OLED to drive the OLED to emit light.

It can be learned from the foregoing descriptions that the first selecting transistor Ms1 in the selecting circuit 301 also needs to be turned on in the third phase ③. Therefore, to simplify a structure of a drive circuit located in the non-display area 101, as shown in FIG. 11, the output Op of the SR is further coupled to the gates g of the first light emitting control transistor M6 and the second light emitting control transistor M5.

Therefore, when the pixel circuit 201 is in the third phase ③, the output Op of the SR cannot only provide the light emitting control signal EM to the gates g of the first light emitting control transistor M6 and the second light emitting control transistor M5, so that the OLED emits light, but also provide a first selecting signal E to the gate g of the first selecting transistor Ms1 in the selecting circuit 301, so that the first initial voltage Vint1 output by the first signal terminal O1 of the display drive circuit 40 is transmitted to the drain d of the first reset transistor M1 of each sub-pixel in the $1^{st}$ row through the first selecting transistor Ms1.

Example 2

Figure 12A:
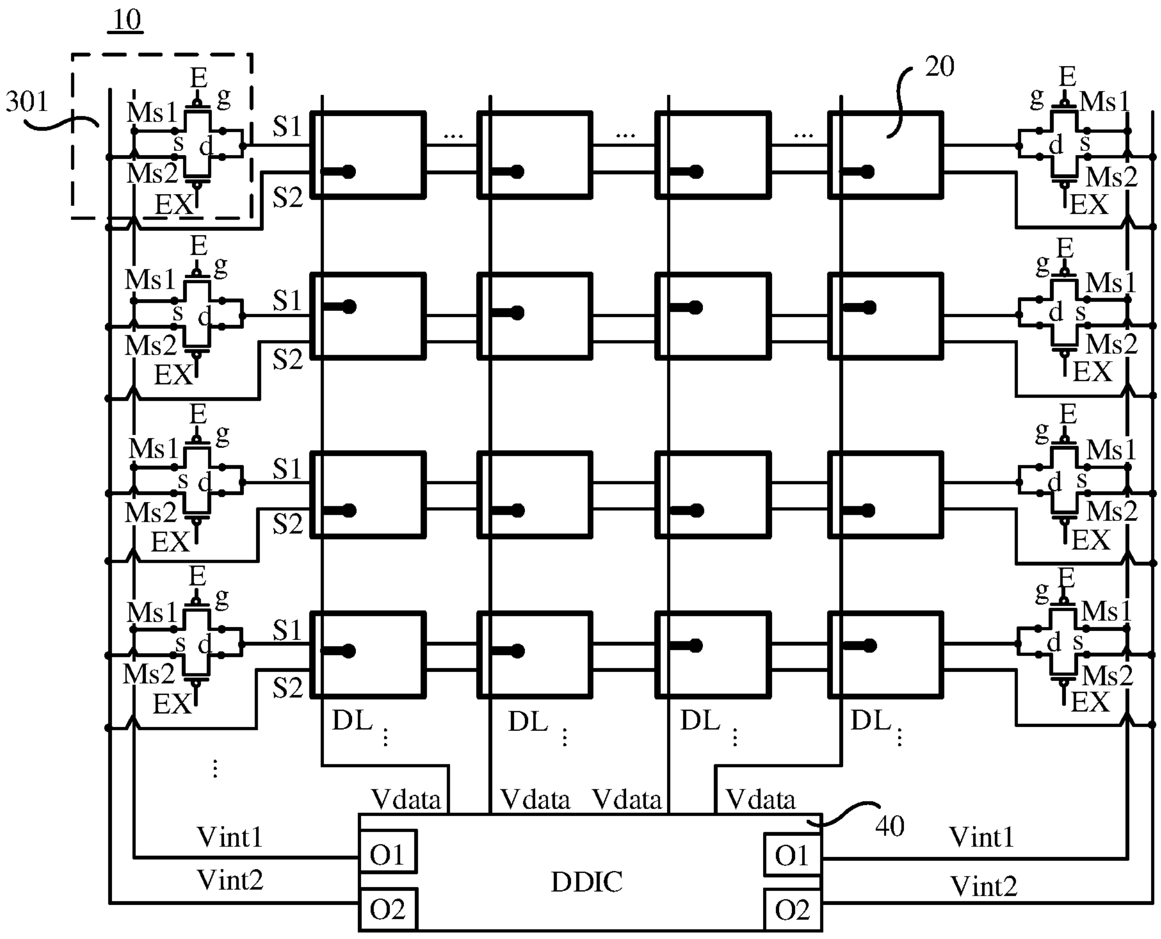
FIG. 12*a* is a schematic diagram of a structure of another display module according to an embodiment of this application.

In this example, as shown in FIG. 12*a*, the display 10 includes M first initial voltage lines S1 and M second initial voltage lines S2. The selecting circuit 301 includes a first selecting transistor Ms1 and a second selecting transistor Ms2.

A connection manner of the first selecting transistor Ms1, the second selecting transistor Ms2, and the first initial voltage line S1 and a coupling manner of the first initial voltage line S1 and a first reset transistor M1 in a pixel circuit of each row of sub-pixels 20 are the same as those in Example 1. Details are not described herein again.

It should be noted that, to provide a first selecting signal E to a gate g of the first selecting transistor Ms1 in the selecting circuit 301 and provide a second selecting signal XE to a gate g of the second selecting transistor Ms2, like that in Example 1, M phase inverters 302 and M cascaded SRs may be disposed in the non-display area. A connection manner of the SR and the phase inverter 302 is the same as that described above. Details are not described herein again.

Figure 12B:
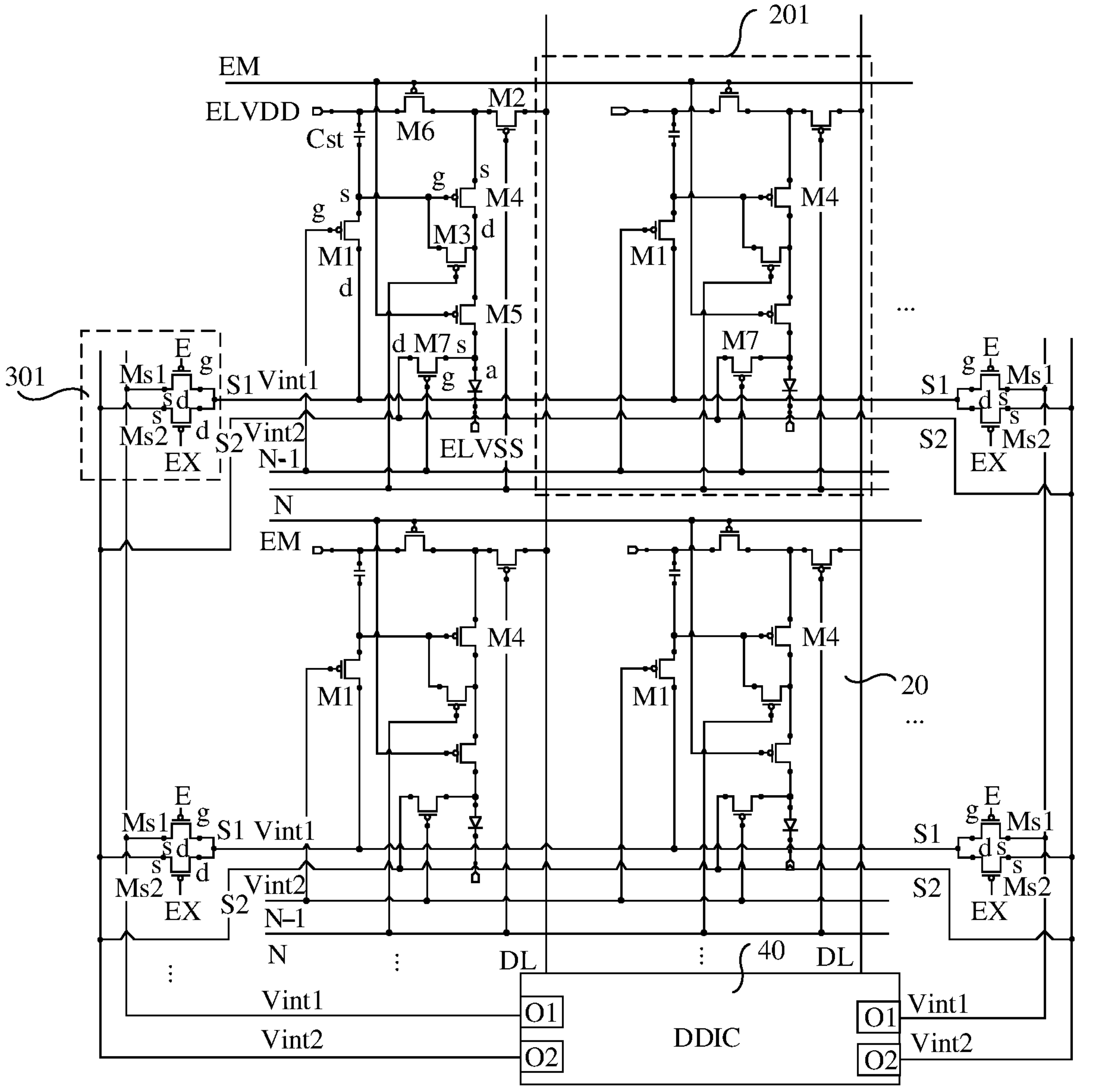
FIG. 12*b* is a schematic diagram of another structure of a display module with a pixel circuit shown in FIG. 2*a* according to an embodiment of this application.

In addition, as shown in FIG. 12*b*, the pixel circuit 201 further includes a second reset transistor M7. Like that in Example 1, a gate g of the second reset transistor M7 is coupled to the gate g of the first reset transistor M1. A first node, for example, a source s, of the second reset transistor M7 is coupled to the anode a of the OLED.

A difference from Example 1 lies in that a second node, for example, a second node, of a second reset transistor M7 in a pixel circuit 201 of the $N^{th}$ (for example, N=1) row of sub-pixels 20 is coupled to the $N^{th}$ (for example, N=1) second initial voltage line S2.

When the display drive circuit 40 has the first signal terminal O1 and the second signal terminal O2, the second initial voltage line S2 is coupled to the second signal terminal O2, and is configured to receive the second initial voltage Vint2 output by the second signal terminal O2.

Figure 13:
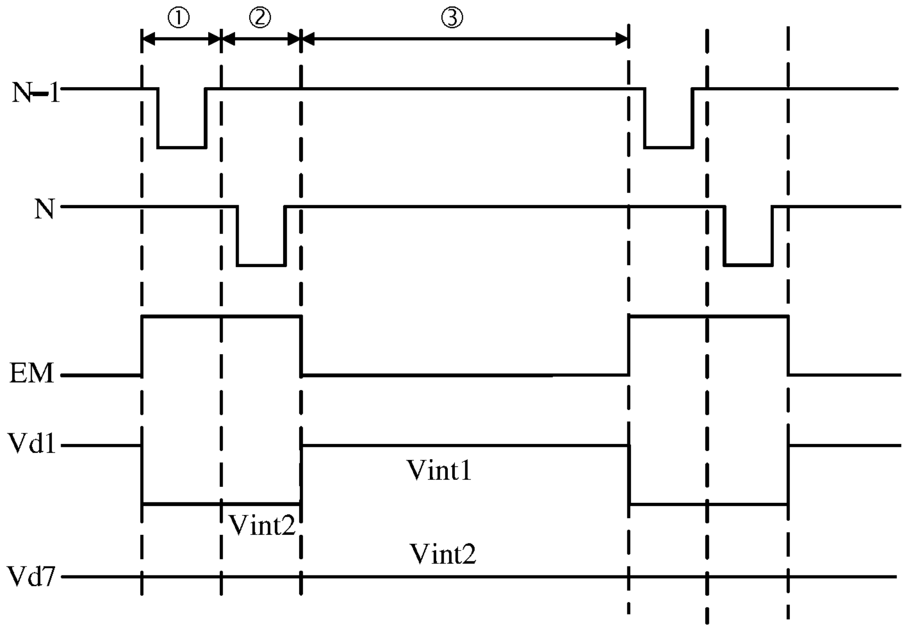
FIG. 13 is a signal sequence diagram according to an embodiment of this application.

In this case, with reference to the sequence diagrams shown in FIG. 3 and FIG. 13 respectively, drain voltages Vd1 and source-drain voltages Vsd1 of first reset transistors M1 and drain voltages Vd7 of second reset transistors M7 in the pixel circuits shown in FIG. 2*a* and FIG. 12*b* at each phase are obtained, as shown in Table 2.

TABLE 2

| | Pixel circuit shown in FIG. 2a | | Pixel circuit shown in FIG. 12b | | |
|---|---|---|---|---|---|
| | Vd1 and Vd7 (unit: V) | Vsd1 (unit: V) | Vd7 (unit: V) | Vd1 (unit: V) | Vsd1 (unit: V) |
| First phase ① | Vint = −4 | 0.1 | Vint2 = −4 | Vint2 = −4 | 0.1 |
| Second phase ② | Vint = −4 | Vdata − \|Vth_M4\| − (−4) | Vint2 = −4 | Vint2 = −4 | Vdata − \|Vth_M4\| − (−4) |
| Third phase ③ | Vint = −4 | | Vint2 = −4 | Vint1 = 1 | Vdata − \|Vth_M4\| − 1 |

It can be learned from Table 2 that, in the first phase ①, namely, the reset phase, it can be learned from the foregoing descriptions that a first-stage SR may control a first selecting transistor Ms1 in a selecting circuit 201 to be cut off and a second selecting transistor Ms2 to be turned on, to transmit the second initial voltage Vint2 provided by the second signal terminal O2 of the display drive circuit 40 to the second node, for example, the drain d, of the first reset transistor M1 through the first initial voltage line S1. The drain voltage Vd1 of the first reset transistor M1 meets Vd1=Vint=Vint2=−4 V.

The first reset transistor M1 is turned on. Under impact of a resistance of the first reset transistor M1, the source s voltage Vs1 of the first reset transistor M1 is less than −4 V. For example, Vs1 may be −3.9 V. In this case, the source-drain voltage Vsd1 of the first reset transistor M1 meets Vsd1=Vs1−Vd1=−3.9−(−4)=0.1 V.

In addition, the second initial voltage line S2 transmits the second initial voltage Vint2 provided by the second signal terminal O2 of the display drive circuit 40 to the second node, for example, the drain d, of the second reset transistor M7. The drain voltage Vd7 of the second reset transistor M7 meets Vd7=Vint=Vint2=−4 V.

In the second phase ②, namely, the data voltage writing phase, the first reset transistor M1 is off, and the drain voltage Vd1 of the first reset transistor M1 meets Vd1=Vint=Vint2=−4 V. In this case, it can be learned from the foregoing descriptions that the transistor M3 in the pixel circuit 201 is on. Therefore, the source-drain voltage Vsd1 of the first reset transistor M1 meets Vsd1=Vdata−|Vth_M4|−(−4)

In addition, because the second reset transistor M7 is also in an off state in this phase, the drain voltage Vd7 of the second reset transistor M7 meets Vd7=Vint=Vint2=−4 V.

In the third phase, namely, the light emitting phase, the first reset transistor M1 is off. Compared with the solution shown in FIG. 2*a*, when the solution shown in FIG. 12*b* is used, the drain voltage Vd1 of the first reset transistor M1 meets Vd1=Vint1=1 V. Therefore, the source-drain voltage Vsd1 of the first reset transistor M1 meets Vsd1=Vdata−|Vth_M4|−1<Vdata−|Vth_M4|−(−4). Therefore, when the OLED emits light, the source-drain voltage Vsd1 of the first reset transistor M1 may be reduced to reduce the leakage current $I_{off\_M1}$ of the first reset transistor M1.

Therefore, when a low refresh rate, for example, 30 Hz, is used for display, a probability that a display flicker phenomenon occurs because the gate voltage Vg4 of the driving transistor M4 undergoes a relatively large voltage drop in the light emitting phase due to the leakage current can be reduced, so that light emitting brightness of the sub-pixels 20 displayed at 30 Hz is close to that of the sub-pixels 20 displayed at 60 Hz.

In addition, because the second node, for example, the drain d, of the second reset transistor M7 is coupled to the second initial voltage line S2, the drain voltage Vd7 of the second reset transistor M7 meets Vd7=Vint=Vint2=−4 V. In this case, compared with Example 1, in this example, in the third phase ③, the drain d voltage Vd7 of the second reset transistor M7 is equal to −4 V, and is less than 1V in Example 1.

This can reduce a probability that, when the sub-pixels are displayed as a black image, a light leakage phenomenon occurs due to light emitting of the OLED because the drain d voltage of the second reset transistor M7 increases in the third phase ③ and a leakage current of the second reset transistor M7 flows to the OLED.

It should be noted that, in this example, the foregoing descriptions are provided by using an example in which the first reset transistor M1, the second reset transistor M7, and the driving transistor M4 in the pixel circuit 201 of the sub-pixel 20 are P-channel transistors.

Figure 12C:
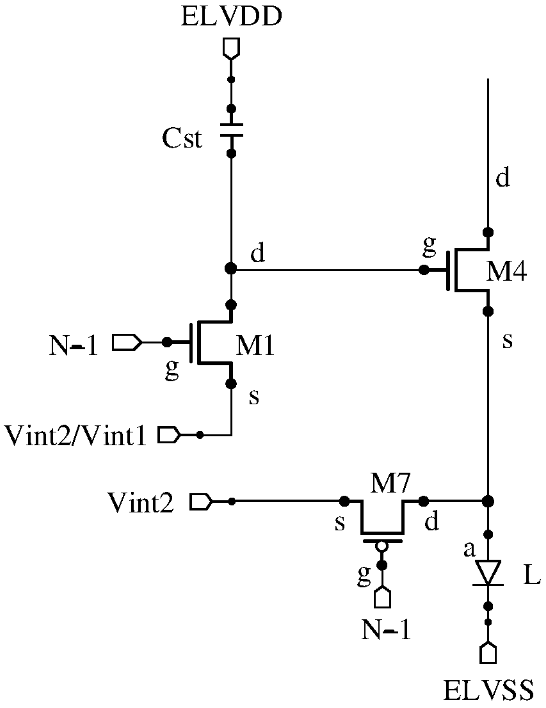
FIG. 12*c* is a schematic diagram of a partial structure of another pixel circuit according to an embodiment of this application.

In some other embodiments of this application, for example, as shown in FIG. 12*c*, the first reset transistor M1, the second reset transistor M7, and the driving transistor M4 in the pixel circuit 201 are N-channel transistors. In this case, when the first reset transistor M1 and the second reset transistor M7 are N-channel transistors, a manner of setting the first initial voltage Vint1 and the second initial voltage Vint2 may be similar. For example, the source voltage Vs1 of the first reset transistor M1 in the first phase ① and the second phase ② may be Vint2, and Vint2=−4 V; and the source voltage Vs1 of the first reset transistor M1 in the third phase ③ may be Vint1, and Vint1=1V. The source voltage Vs7 of the second reset transistor M7 in the first phase ①, the second phase ②, and the third phase ③ may be Vint2, and Vint2=−4 V.

Some embodiments of this application further provide a control method for a display module. The display module includes a display 10 and a display drive circuit 40 shown in FIG. 14. The display 10 includes M rows of sub-pixels 20 arranged in a matrix form. M≥2, and M is a positive integer.

A pixel circuit 201 of each sub-pixel 20 includes a driving transistor M4, a first reset transistor M1, a first capacitor Cst, and a light emitting device L. A first node, for example, a source (source, s), of the first reset transistor M1 is coupled to a gate (gate, g) of the driving transistor M4 and a first terminal of the first capacitor Cst. A second terminal of the first capacitor Cst is coupled to a first power voltage input (configured to output a first power voltage ELVDD).

It can be learned from the foregoing descriptions that, a first node, for example, a source s, of the driving transistor M4 is coupled to the first power voltage input in a light emitting phase, so that the first power voltage ELVDD output by the first power voltage input can be received. The first node, for example, the source s, of the driving transistor M4 is coupled to a data voltage output port VO of a DDIC in a data voltage writing phase, to receive a data voltage Vdata output by the data voltage output port VO. A second node, for example, a drain (drain, d for short), of the driving transistor M4 is coupled to the light emitting device L.

Figure 15:
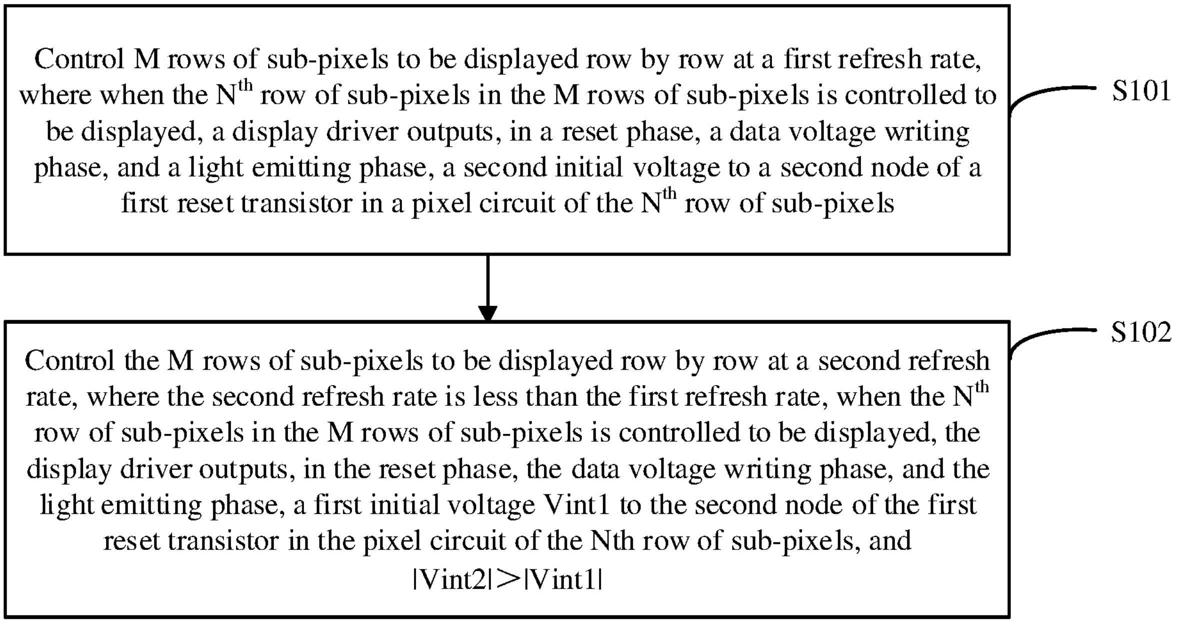
FIG. 15 is a flowchart of a control method for a display module according to an embodiment of this application.

In view of this, as shown in FIG. 15, the control method for the display module includes S101 and S102.

S101. Control the M rows of sub-pixels 20 to be displayed row by row at a first refresh rate, for example, 60 Hz. When the $N^{th}$ row of sub-pixels 20 in the M rows of sub-pixels 20 is controlled to be displayed, in a reset phase (the first phase ① in FIG. 3), a data voltage writing phase (the second phase ② in FIG. 3), and a light emitting phase (the third phase ③ in FIG. 3), a second initial voltage Vint2 is output to a second node, for example, a drain d, of a first reset transistor M1 in a pixel circuit 201 of the $N^{th}$ row of sub-pixels 20 by using a first signal terminal O1 shown in FIG. 14. For example, the second initial voltage Vint2 may be −4 V.

S102. Control the M rows of sub-pixels 20 to be displayed row by row at a second refresh rate, for example, 30 Hz. The second refresh rate is less than the first refresh rate. When the $N^{th}$ row of sub-pixels 20 in the M rows of sub-pixels 20 is controlled to be displayed, in the reset phase (the first phase ① in FIG. 3), the data voltage writing phase (the second phase ② in FIG. 3), and the light emitting phase (the third phase ③ in FIG. 3), a first initial voltage Vint1 is output to the second node, for example, the drain d, of the first reset transistor M2 in the pixel circuit 20 of the $N^{th}$ row of sub-pixels 20 by using the first signal terminal O1 shown in FIG. 14. |Vint2|>|Vint1|.

For example, to enable the first initial voltage Vint1 to effectively reset a gate g of the driving transistor M4 in the reset phase to clear a residual voltage of a previous image frame, a voltage with a negative value, for example, −3 V or −2 V, may be selected as the first initial voltage Vint1.

In view of this, when a high refresh rate, for example, 60 Hz, is switched to a low refresh rate, for example, 30 Hz, the first initial voltage Vint1 whose absolute value is greater than that of the second initial voltage Vint2 is provided to the second node of the first reset transistor M2, so that a source-drain voltage Vsd1 of the first reset transistor M1 can be reduced to reduce a leakage current $I_{off\_M1}$ of the first reset transistor M1. Therefore, a relatively large voltage drop of a gate voltage Vg4 of the driving transistor M4 in the light emitting phase due to the leakage current can be reduced, so that light emitting brightness of the sub-pixels 20 displayed at 30 Hz is close to that of the sub-pixels 20 displayed at 60 Hz. Therefore, when the refresh rates are alternated, a probability of a sudden increase of display brightness is reduced, so that a human eye cannot keenly capture a brightness change, and an occurrence probability of a display flicker phenomenon is reduced.

In this case, to implement S101 and S102, some embodiments of this application provide a display drive circuit. The display drive circuit is coupled to the display 10, and may be configured to perform S101 and S102. The display drive circuit achieves same technical effects those achieved by the control method for the display module provided in the foregoing embodiment. Details are not described herein again.

Alternatively, in some other embodiments of this application, the electronic device may include a display 10 and a display drive circuit 40 coupled to the display 10.

The display drive circuit 40 is configured to perform the following step in S101: controlling the M rows of sub-pixels 20 to be displayed row by row at the first refresh rate, for example, 60 Hz.

Figure 14:
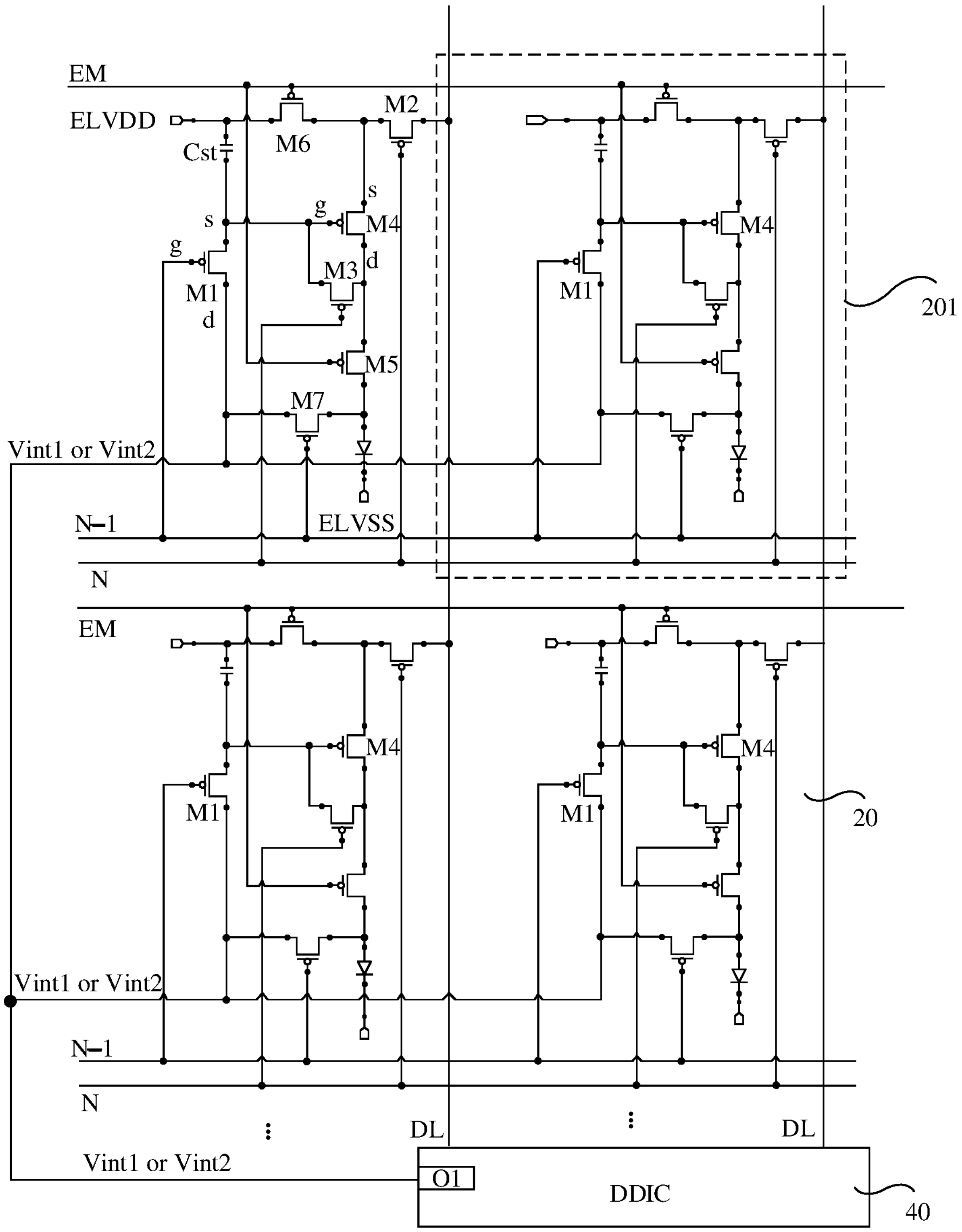
FIG. 14 is a schematic diagram of a structure of another display module according to an embodiment of this application.

The display drive circuit 40 is configured to perform the following step in S101: when the $N^{th}$ row of sub-pixels 20 in the M rows of sub-pixels 20 is controlled to be displayed, in the reset phase (the first phase ① in FIG. 3), the data voltage writing phase (the second phase ② in FIG. 3), and the light emitting phase (the third phase ③ in FIG. 3), outputting the second initial voltage Vint2 to the second node, for example, the drain d, of the first reset transistor M1 in the pixel circuit 201 of the $N^{th}$ row of sub-pixels 20 by using the first signal terminal O1 shown in FIG. 14. For example, the second initial voltage Vint2 may be −4 V.

In addition, the display drive circuit 40 is further configured to perform the following step in S102: controlling the M rows of sub-pixels 20 to be displayed row by row at the second refresh rate, for example, 30 Hz.

The display drive circuit 40 is further configured to perform the following step in S102: when the $N^{th}$ row of sub-pixels 20 in the M rows of sub-pixels 20 is controlled to be displayed, in the reset phase (the first phase ① in FIG. 3), the data voltage writing phase (the second phase ② in FIG. 3), and the light emitting phase (the third phase ③ in FIG. 3), outputting the first initial voltage Vint1 to the second node, for example, the drain d, of the first reset transistor M2 in the pixel circuit 20 of the $N^{th}$ row of sub-pixels 20 by using the first signal terminal O1 shown in FIG. 14. The electronic device achieves same technical effects those achieved by the control method for the display module provided in the foregoing embodiment. Details are not described herein again.

In addition, an embodiment of this application provides a computer-readable medium. The computer-readable medium stores a computer program. When the computer program is executed by a processor, the foregoing method is implemented.

The computer-readable medium may be a read-only memory (read-only memory, ROM), another type of static storage device that can store static information and instructions, a random access memory (random access memory, RAM), or another type of dynamic storage device that can store information and instructions; or may be an electrically erasable programmable read-only memory (Electrically Erasable Programmable Read-Only Memory, EEPROM), or any other medium that can be configured to carry or store expected program code in a form of an instruction or a data structure and that can be accessed by a computer. However, this does not constitute a limitation herein. The memory may exist independently and is connected to the processor by using a communications bus. Alternatively, the memory may be integrated with the processor.

All or some of the foregoing embodiments may be implemented by software, hardware, firmware, or any combination thereof. When a software program is used to implement the embodiments, some or all of the embodiments may be implemented in a form of a computer program product. The computer program product includes one or more computer instructions. When computer-executable instructions are loaded and executed on a computer, all or some of the processes or functions according to the embodiments of this application are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A display module, comprising:

a display;

a display drive circuit; and at least one driver group;

wherein the display comprises M rows of sub-pixels arranged in a matrix form, wherein a pixel circuit of each sub-pixel comprises a driving transistor, a first reset transistor, a first capacitor, and a light emitting device, wherein M≥2, and wherein M is a positive integer;

wherein a first node of the first reset transistor is coupled to a gate of the driving transistor and a first terminal of the first capacitor, wherein a second terminal of the first capacitor is coupled to a first power voltage input, wherein a first node of the driving transistor is coupled to the first power voltage input and a data voltage output port of the display drive circuit, wherein a second node of the driving transistor is coupled to the light emitting device, wherein the first node of the first reset transistor is a source and a second node is a drain, or the first node of the first reset transistor is the drain and the second node is the source, wherein the first node of the driving transistor is a source and the second node is a drain, or the first node of the driving transistor is a drain and the second node is a source, wherein the first power voltage input is configured to provide a first power voltage, and wherein the data voltage output port is configured to output a data voltage;

wherein each driver group of the at least one drive group comprises M selecting circuits, wherein each selecting circuit is coupled to the display drive circuit, and is configured to receive a first initial voltage Vint1 and a second initial voltage Vint2 that are output by the display drive circuit, and wherein |Vint2|>|Vint1|;

wherein an $N^{th}$ selecting circuit of the M selecting circuits is coupled to a second node of a first reset transistor in a pixel circuit of an $N^{th}$ row of sub-pixels of the M rows of sub-pixels, wherein each selecting circuit is further configured to output the second initial voltage Vint2 to the second node of the first reset transistor when the pixel circuit is in a reset phase and a data voltage writing phase, wherein each selecting circuit is further configured to output the first initial voltage Vint1 to the second node of the first reset transistor when the pixel circuit is in a light emitting phase, wherein 1≤N≤M, and wherein N is a positive integer; and wherein the reset phase is a phase in which the first reset transistor is on, wherein the data voltage writing phase is a phase in which the data voltage is applied to the first node of the driving transistor, and wherein the light emitting phase is a phase in which the light emitting device emits light.

2. The display module according to claim 1, wherein the display further comprises M first initial voltage lines, and wherein an $N^{th}$ first initial voltage line of the M first initial voltage lines is coupled to the second node of the first reset transistor in the pixel circuit of the $N^{th}$ row of sub-pixels;

wherein each selecting circuit comprises a first selecting transistor and a second selecting transistor;

wherein a first node of the first selecting transistor in the $N^{th}$ selecting circuit is coupled to the display drive circuit, wherein a second node of the first selecting transistor is coupled to the $N^{th}$ first initial voltage line, and wherein a gate of the first selecting transistor is configured to receive a first selecting signal;

wherein a first node of the second selecting transistor in the $N^{th}$ selecting circuit is coupled to the display drive circuit, wherein a second node of the second selecting transistor is coupled to the $N^{th}$ first initial voltage line, wherein a gate of the second selecting transistor is configured to receive a second selecting signal, and wherein the second selecting signal is a reverse-phase signal of the first selecting signal; and wherein the first node of the first selecting transistor is a source and the second node is a drain or the first node of the first selecting transistor is the drain and the second node is the source, and wherein the first node of the second selecting transistor is a source and the second node is a drain or the first node of the second selecting transistor is the drain and the second node is the source.

3. The display module according to claim 2, wherein the display drive circuit has at least one first signal terminal and at least one second signal terminal, wherein the at least one first signal terminal outputs the first initial voltage Vint1, and wherein the second signal terminal outputs the second initial voltage Vint2; and wherein the first node of the first selecting transistor is coupled to the first signal terminal, and wherein the first node of the second selecting transistor is coupled to the second signal terminal.

4. The display module according to claim 3, wherein the display further comprises M second initial voltage lines; and wherein the pixel circuit further comprises a second reset transistor;

wherein a gate of the second reset transistor is coupled to a gate of the first reset transistor, wherein a first node of the second reset transistor is coupled to the light emitting device, and wherein a second node of the second reset transistor in the pixel circuit of the $N^{th}$ row of sub-pixels is coupled to an $N^{th}$ second initial voltage line of the M second initial voltage line;

wherein the $N^{th}$ second initial voltage line is further coupled to the second signal terminal of the display drive circuit; and wherein the first node of the second reset transistor is a source and the second node is a drain, or the first node of the second reset transistor is the drain and the second node is the source.

5. The display module according to claim 2, wherein the pixel circuit of each sub-pixel further comprises a second reset transistor;

wherein a gate of the second reset transistor is coupled to a gate of the first reset transistor, and wherein a first node of the second reset transistor is coupled to the light emitting device;

wherein a second node of a second reset transistor in the pixel circuit of the $N^{th}$ row of sub-pixels is coupled to the $N^{th}$ first initial voltage line; and wherein the first node of the second reset transistor is a source and the second node is a drain, or the first node of the second reset transistor is the drain and the second node is the source.

6. The display module according to claim 2, wherein the driver group further comprises M phase inverters and M cascaded shift registers;

wherein an output of an $N^{th}$ shift register of the M cascaded shift registers is coupled to an input of an $N^{th}$ phase inverter of the M phase inverters and to the gate of the first selecting transistor in the $N^{th}$ selecting circuit, and wherein the output of the $N^{th}$ shift register is configured to output the first selecting signal; and wherein an output of the $N^{th}$ phase inverter is coupled to the gate of the second selecting transistor in the $N^{th}$ selecting circuit, and wherein the output of the $N^{th}$ phase inverter is configured to output the second selecting signal.

7. The display module according to claim 6, wherein each pixel circuit of each sub-pixel further comprises a first light emitting control transistor and a second light emitting control transistor;

wherein a first node of the first light emitting control transistor is coupled to the first power voltage input, and wherein a second node of the first light emitting control transistor is coupled to the first node of the driving transistor;

wherein a first node of the second light emitting control transistor is coupled to the second node of the driving transistor, and wherein a second node of the second light emitting control transistor is coupled to the light emitting device of a respective pixel circuit;

wherein the light emitting device is further coupled to a second power voltage input, and the second power voltage input is configured to input a second power voltage;

wherein the output of the $N^{th}$ shift register is further coupled to gates of the first light emitting control transistor and the second light emitting control transistor; and wherein the first node of the first light emitting control transistor is a source and the second node is a drain, or the first node of the first light emitting control transistor is the drain and the second node is the source; and wherein the first node of the second light emitting control transistor is a source and the second node is a drain, or the first node of the second light emitting control transistor is the drain and the second node is the source.

8. The display module according to claim 1, wherein the display module comprises a first driver group and a second driver group, and wherein the first driver group and the second driver group are respectively located on two sides of a display area of the display; and wherein both an $N^{th}$ selecting circuit in the first driver group and an $N^{th}$ selecting circuit in the second driver group are coupled to the second node of the first reset transistor in the pixel circuit of the $N^{th}$ row of sub-pixels.

9. The display module according to claim 1, wherein the display module comprises a substrate;

wherein the pixel circuit, the display drive circuit, and the driver group are disposed on the substrate; and wherein a material that the substrate is made of comprises a flexible material or a tensile material.

* * * * *